(12) United States Patent
Burchardt et al.

(10) Patent No.: US 9,288,022 B2
(45) Date of Patent: Mar. 15, 2016

(54) METHOD FOR CONTROLLING OPERATION WITHIN A CELL OF A WIRELESS CELLULAR NETWORK, BASE STATION AND WIRELESS CELLULAR NETWORK

(71) Applicant: NTT DOCOMO, Inc., Chiyoda-ku, Tokyo (JP)

(72) Inventors: Harald Burchardt, Munich (DE); Harald Haas, Munich (DE); Zubin Bharucha, Munich (DE)

(73) Assignee: NTT DOCOMO, INC., Tokyo (JP)

(*) Notice: Subject to any disclaimer, the term of this patent is extended or adjusted under 35 U.S.C. 154(b) by 82 days.

(21) Appl. No.: 14/056,610

(22) Filed: Oct. 17, 2013

(65) Prior Publication Data

US 2014/0113644 A1   Apr. 24, 2014

(30) Foreign Application Priority Data

Oct. 18, 2012   (EP) .................................... 12189068

(51) Int. Cl.
*H04W 72/00* (2009.01)
*H04L 5/00* (2006.01)
*H04W 72/08* (2009.01)
*H04W 52/24* (2009.01)

(52) U.S. Cl.
CPC ............ *H04L 5/0032* (2013.01); *H04L 5/0073* (2013.01); *H04W 52/244* (2013.01); *H04W 72/082* (2013.01)

(58) Field of Classification Search
CPC ..... H04W 16/02; H04W 16/10; H04W 24/00; H04W 24/02; H04W 28/04; H04W 72/04; H04W 72/082

USPC ............ 455/450, 452.1, 67.11, 67.13, 226.1, 455/226.2, 522
See application file for complete search history.

(56) References Cited

U.S. PATENT DOCUMENTS

| 2002/0041584 | A1 | 4/2002 | Sashihara |
| 2007/0177500 | A1 | 8/2007 | Chang et al. |
| 2009/0110087 | A1* | 4/2009 | Liu et al. .................... 375/260 |

FOREIGN PATENT DOCUMENTS

| JP | 5-227079 A | 9/1993 |
| JP | 2005-39719 A | 2/2005 |
| JP | 2012-532531 A | 12/2012 |
| WO | WO 2011/003008 A2 | 1/2011 |
| WO | WO 2011/038410 A1 | 3/2011 |

OTHER PUBLICATIONS

Abeta, Sadayuki, "Toward LTE Commercial Launch and Future Plan for LTE Enhancements (LTE-Advanced)," 2010 IEEE International Conference on Communication Systems (ICCS), Nov. 2010, pp. 146-150.

(Continued)

*Primary Examiner* — Temica M Beamer
(74) *Attorney, Agent, or Firm* — Brinks Gilson & Lione

(57) ABSTRACT

A wireless cellular network includes a plurality of cells, each cell including a base station for serving one or more mobile users. For controlling an operation within a cell of the wireless cellular network, a fuzzy logic is used. The input variables for the fuzzy logic include input variables determined on the basis of information only locally available in the cell.

18 Claims, 21 Drawing Sheets

(56) References Cited

OTHER PUBLICATIONS

Cheng, Shin-Ming et al., "On Exploiting Cognitive Radio to Mitigate Interference in Macro/Femto Heterogeneous Networks," IEEE Wireless Communications, vol. 18, No. 3, Jun. 2011, pp. 40-47.

Choi, Bum-Gon et al., "A Femtocell Power Control Scheme to Mitigate Interference Using Listening TDD Frame," Proceedings of the International Conference on Information Networking (ICOIN), Jan. 2011, pp. 241-244.

Chu, Xiaoli et al, "Resource Allocation in Hybrid Macro/Femto Networks," Wireless Communications and Networking Conference Workshops (WCNCW), IEEE, Apr. 2010, pp. 1-5.

Ellenbeck, Jan et al., "Decentralized Inter-Cell Interference Coordination by Autonomous Spectral Reuse Decisions," $14^{th}$ European Wireless Conference (EW), Jun. 2008, pp. 1-7.

Garcia, Luis G. et al., "Autonomous Component Carrier Selection: Interference Management in Local Area Environments for LTE-Advanced," IEEE Communications Magazine, vol. 47, No. 9, Sep. 2009, pp. 110-116.

Garcia, Luis G. et al., "Autonomous Component Carrier Selection for Local Area Uncoordinated Deployment of LTE-Advanced," $70^{th}$ Vehicular Technology Conference Fall (VTC 2009-Fall), IEEE, Sep. 2009, pp. 1-5.

Hong, Eun Jin et al., "Decentralized Power Control Scheme in Femtocell Networks: A Game Theoretic Approach," Proceeding of Personal, Indoor and Mobil Radio Communications (PIMRC), 2009, pp. 415-419.

Iwamura, Mikio et al., "Carrier Aggregation Framework in 3GPP LTE-Advanced," IEEE Communications Magazine, vol. 48, No. 8, Aug. 2010, pp. 60-67.

Lee, Chiao et al., "Distributed Channel Selection Principles for Femtocells with Two-tier Interference," $71^{st}$ Vehicular Technology Conference (VTC 2010-Spring), May 2010, pp. 1-5.

Li, Xiangfang et al., "Downlink Power Control in Co-Channel Macrocell Femtocell Overlay," Proceedings of the Conference on Information Sciences and Systems (CISS), IEEE, 2009, pp. 383-388.

Li, Yang-Yang et al., "Cognitive Interference Management in 3G Femtocells," the $20^{th}$ Personal, Indoor and Mobile Radio Communications Symposium 2009 (PIMRC'09), IEEE, Sep. 2009, pp. 1118-1122.

Ling, Jonathan et al., "On Resource Allocation in Dense Femto-deployments," IEEE International Conference on Microwaves, Communications, Antennas and Electronic Systems, COMCAS 2009, Nov. 2009, pp. 1-6.

López-Perez, David et al., "Enhanced Intercell Interference Coordination Challenges in Heterogeneous Networks," IEEE Wireless Communications, vol. 18, No. 3, Jun. 2011, pp. 22-30.

Madan, Ritesh et al., "Cell Association and Interference Coordination in Heterogeneous LTE-A Cellular Networks," IEEE Journal on Selected Areas in Communications, vol. 28, No. 9, Dec. 2010, pp. 1479-1489.

Rao, Anil M., "Reverse Link Power Control for Managing Inter-cell Interference in Orthogonal Multiple Access Systems," Proceedings of the Vehicular Technology Conference (VTC), Oct. 2007, pp. 1837-1841.

Srivastava, Arty et al., "Packetized Wireless Access for Data Traffic in Frequency Reuse Environments," 7th IEEE International Symposium on Taipei, Tawian, Oct. 1996, New York, NY, IEEE, vol. 3, pp. 1150-1154.

Zhang, Lu et al., "Cognitive Interference Management for LTE-A Femtocells with Distributed Carrier Selection," $72^{nd}$ Vehicular Technology Conference Fall (VTC 2010-Fall), IEEE, Sep. 2010, pp. 1-5.

Extended European Search Report for European Application No. 12189068.5, dated Feb. 15, 2013, 7 pages.

* cited by examiner

| Comb. | Des. Rate | Signal | Interference | Fading | RB Alloc. | Power |
|---|---|---|---|---|---|---|
| AND | | not low | low | | yes | half |
| AND | low | not low | med | deep | yes | max. |
| AND | not low | | high | | no | |
| AND | low-med | not low | med | not deep | yes | max. |
| AND | med-high | not low | med | peak | yes | max. |
| OR | | | high | deep | no | |
| AND | | high | | not deep | yes | half |
| AND | | low | not low | | no | |
| AND | med-high | high | med | peak | yes | half |

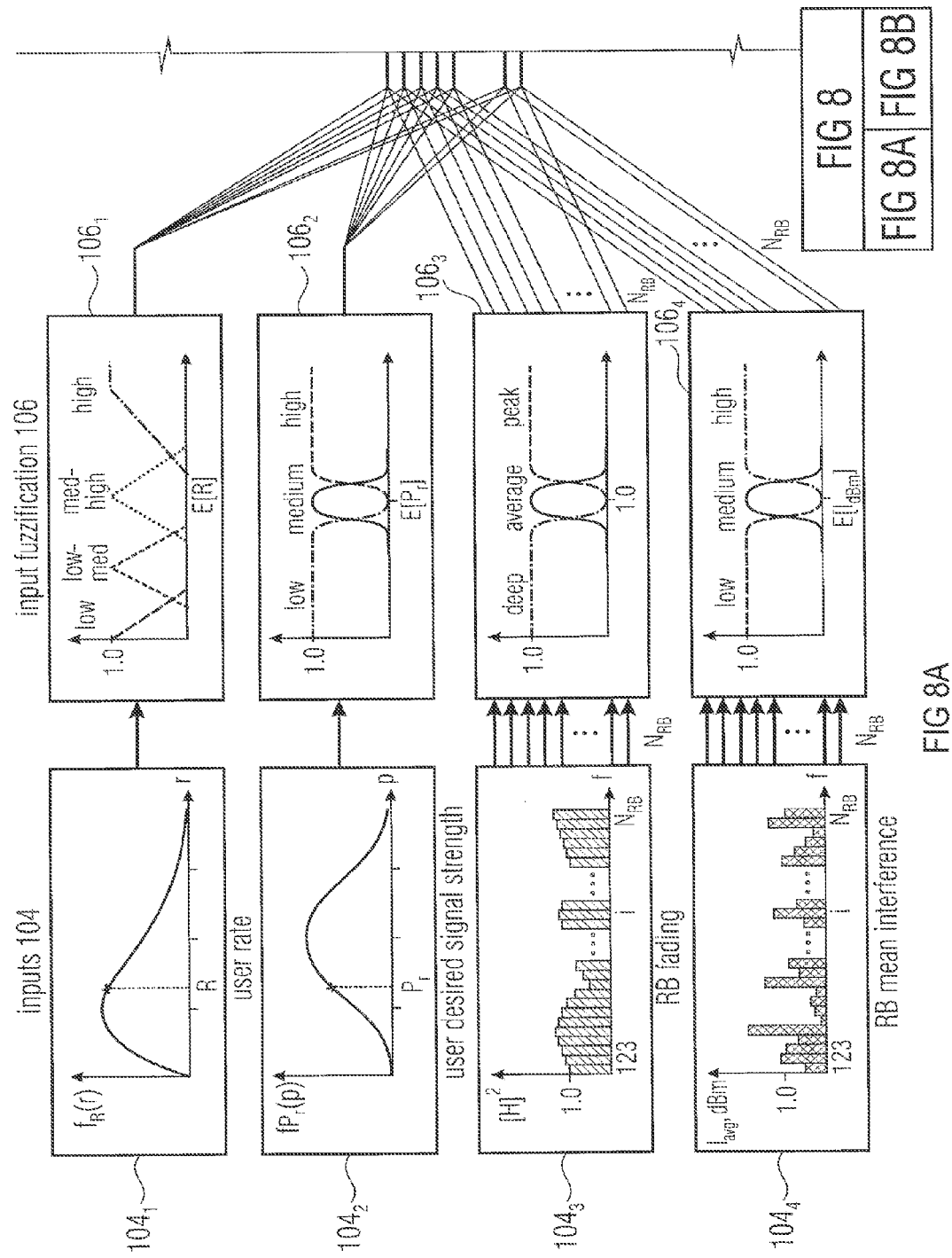

| Parameter | Value |
| --- | --- |
| apartment width, R | 10 m |
| FSB probability, $p_{act}$ | 0.5 |
| average rate, R | 1 Mbps |
| modulation | {1, 2, 3, 4} bits/s/Hz |
| number of available Rbs, M | 50 |
| RB bandwidth, $B_{RB}$ | 180 kHz |
| subcarriers per RB, $k_{sc}$ | 12 |
| symbol rate per subcarrier, $\varrho_s$ | 15 ksps |
| time slots | 20 |
| thermal noise, $\eta$ | −174 dBm/Hz |
| total MS transmit power | 10 dBm |
| shadowing std. dev., $\sigma$ | 10 dB |

FIG 10

USER THROUGHPUT

SYSTEM THROUGHPUT

AVAILABILITY

FAIRNESS

AVAILABILITY

USER THROUGHPUT

SYSTEM THROUGHPUT

AVAILABILITY

FAIRNESS

AVAILABILITY

USER THROUGHPUT

SYSTEM THROUGHPUT

AVAILABILITY

FAIRNESS

AVAILABILITY

SIGNAL ENERGY PDFs

SIGNAL ENERGY CDFs

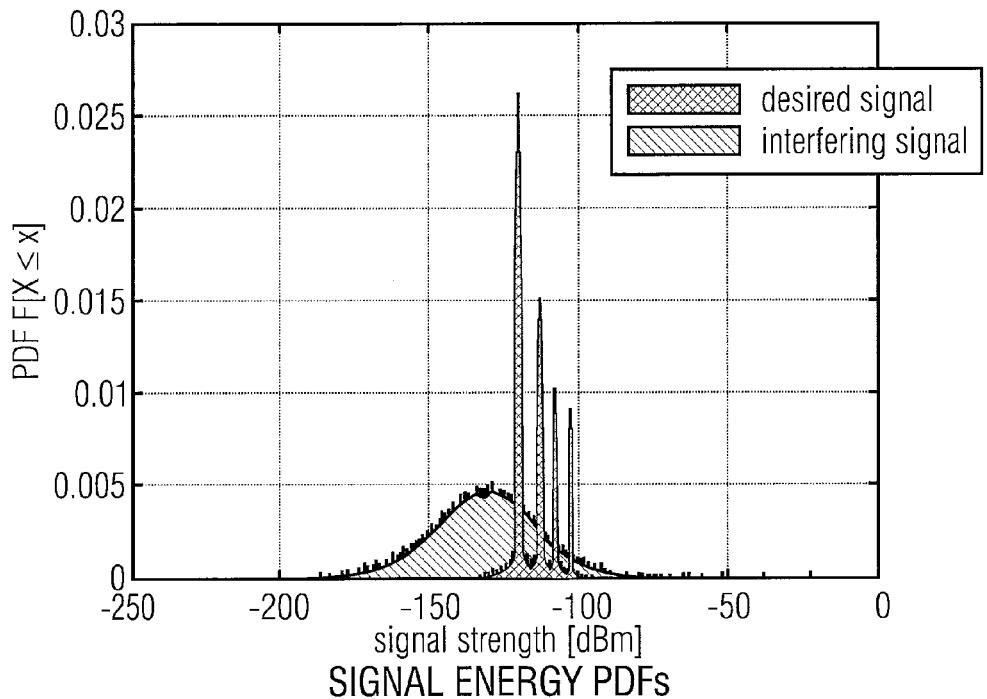
FIG 17A — SIGNAL ENERGY PDFs
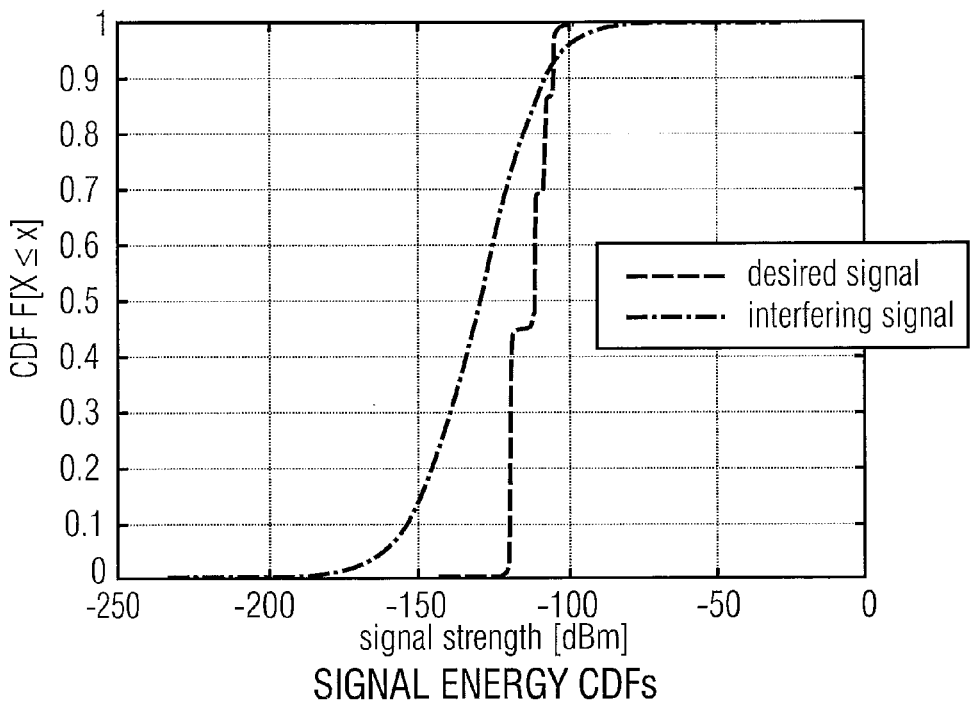
FIG 17B — SIGNAL ENERGY CDFs

METHOD FOR CONTROLLING OPERATION WITHIN A CELL OF A WIRELESS CELLULAR NETWORK, BASE STATION AND WIRELESS CELLULAR NETWORK

RELATED APPLICATIONS

This application claims priority under 35 U.S.C. §119 to European Patent Application No. 12189068.5-2412 filed on Oct. 18, 2012, the entire content of which is hereby incorporated by reference.

BACKGROUND OF THE INVENTION

The present invention relates to the field of wireless cellular networks, more specifically to an approach for controlling operation within a cell of a wireless cellular network, to a base station of such a wireless cellular network and to a wireless cellular network, wherein the approach allows controlling operation within the cell on the basis of information only locally available in the cell.

Wireless communication systems are moving towards heterogeneous architectures, as it is for example described in reference [1]. In such architecture within a cell a user may have different types of access points (APs), for example, as is described in reference [1] four different types of access points, like macro-, pico-, femto-cells, relays and/or remote radio heads. Basically, this may provide many positive effects for a mobile station (MS), which can now choose among several connections to find the most suitable one. However, for example femto-cellular overlays provide many difficulties and challenges, for example, with regard to the cell-organization/optimization, the resource assignment to users and, especially, the interference coordination between access points within the same cell and one or more neighboring cells.

FIG. 1 shows a schematic representation of an exemplary heterogeneous network, more specifically a densely deployed HetNet scenario. FIG. 1 shows a cell 100 of a wireless cellular network. The cell 100 comprises a base station BS serving a plurality of mobile stations MS1 and MS2 within the cell 100. The cell 100 includes three sectors $101_1$ to $101_3$, and mobile station MS1 is in sector $100_1$, and mobile station MS2 is located in sector $100_3$. FIG. 1 further shows relay stations RS1 in sector $100_1$ and RS2 in sector $100_3$. The relay stations serve an area within the respective sectors as it is indicated by the shaded portion around them. In addition, the cell 100 comprises two pico-cells PC1 and PC2 in sectors $100_1$ and $100_2$, respectively. Again, the area served by the pico-cells PC1 and PC2 is indicated by the shaded area around the base stations (depicted by respective antennas) of the pico-cells. Further, the cell 100 comprises femto-cells FC1 to FC4, wherein each of the sectors includes at least one of the femto-cells. In the example depicted in FIG. 1, mobile station MS1 in sector $100_1$ is served by the relay station RS1, as is indicated by the arrow A1. Mobile station MS2 in sector $100_3$ is served by the base station BS of the cell 100 as is indicated by arrow A2. In addition, in a cell 100 as it is depicted in FIG. 1, the respective mobile stations may experience also interference from other radio sources. Exemplary sources for interference with the mobile station MS1 are the base station BS and the pico-cell PC1, as indicated by arrows I1 and I2. In sector $100_3$ the relay station RS2 and the femto-cell FC3 are assumed to be a source of interference for mobile station MS2, as is indicated by arrows I3 and I4.

In view of the various types, locations and densely deployment of access points, like the relay stations, the pico-cells and the femto-cells as depicted in FIG. 1, and due to the different transmission powers/ranges associated therewith, numerous technical challenges are posed, for example by femto/pico-cell overlays, as it is described in detail in references [1], [2] or [3]. Basically, these challenges fall into the following areas:

Network self-organization: self-configuration, -healing, and -optimization are necessitated for all cells. These tasks become increasingly difficult given the additional number of network parameters that need to be considered in an environment as it is schematically depicted in FIG. 1.

Backhauling: the connections of different base stations to the core-network necessitate additional infrastructure, however, in case of femto-cells it is not possible to guarantee a connection through the user's DSL line thereby leaving the user without connection to the backhaul system.

Handover: the higher number of access points increases the amount of handover decisions to be made within the network.

Interference: cross-tier interference will be created to/from the overlaid cells, for example, the pico/femto-cells shown in FIG. 1. This interference has to be mitigated to maintain performance, especially, in case access to the cells is restricted, as in such a situation also the high intra-femto-tier interference due to the dense deployment is of concern.

The handling of interference within and across tiers is paramount to the performance of a wireless network, and the main sources of interference in densely deployed femto-cell scenarios (see reference [1]) can be categorized and broken down as follows:

Unplanned deployment:
Low-power nodes, e.g., femto-cells, are deployed by end users at "random" locations, and can be active or inactive at any time thereby further randomizing the possible interference.
In view of the backhauling difficulty (such as a non-operator DSL connection), the interference coordination with the femto-cells may not be possible.
A continuous sensing and monitoring is necessitated by the cells to dynamically/adaptively mitigate interference from the other tiers.
Inter-tier interference needs to be considered due to the densely deployed femto-cells.

Closed-subscriber access:
Restricted access control of pico- and femto-cells may lead to strong interference scenarios both in the uplink and downlink, in case the user cannot carry out a handover.
This will cause large interference at the mobile stations that are near femto-cells or pico-cells but cannot access these cells (see arrows I2 and I4 in FIG. 1).

Node transmission power differences:
The low power of nodes of pico- and femto-cells may cause an association issue and also downlink/uplink interference problems, for example, a mobile station near a pico-cell connected (in the downlink) to a high power macro-base station may cause a large uplink interference at the pico-cell For addressing interference issues, in the art, standard inter-cell interference coordination techniques (ICIC techniques) are known, however, these ICIC techniques utilize a centralized approach, and mainly deal with macro-to-macro or small cell-to-macro interference reduction, as is described in references [1], [2] and [3]. However, as outlined above, in a scenario as it is schematically depicted in FIG. 1, there is no guarantee for a backhaul connection between the different access points so that such schemes, without guarantee of backhaul connections between the different access points, are ineffective.

In references [4] and [5] downlink power control mechanisms are suggested to prevent large co-channel interference (CCI) from a femto-cell base station at nearby macro-users (see for example femto-cell FC3 in FIG. 1). In reference [4], the downlink power control problem is formulated to address CCI, while the quality of service requirements for both the macro- and femto-users are taken into account. This is in contrast to reference [5] in accordance with which macro-cell users are given priority. In this approach, a listening time-division duplex frame is utilized to estimate the channel quality information of the surrounding macro-users, and to adjust the femto-cell base station downlink transmit power accordingly. References [4] and [5] both deal with interference reduction to the macro-cell in the downlink, whereas the femto-femto interference issue is disregarded.

Reference [6] chooses a game theoretic approach to manage downlink interference between femto-cells and the macro-cells. A proportional fair metrical use to minimize interference and improve throughput fairness, however, the overall system throughput suffers. A further proposal for addressing the uplink power control problem is described in reference [7] and uses conventional and/or fractional power control. These procedures, however, are developed for the macro-cellular environment, and do not guarantee quality of service.

For enhancing the throughput in a wireless cellular network, fractional frequency reuse (FFR) may be used, and in accordance with this approach, in a wireless cellular network, the throughput of cell-edge users is enhanced by allocating orthogonal resources in neighboring cells. However, because FFR decreases the spatial reuse of resources, the system capacity inherently suffers. Additionally, the unpredictable variations of the interference environment caused by the uncoordinated deployment of femto-cells necessitates a dynamic interference reuse approach aiming at adapting the spatial reuse of the radio sources to the observed interference conditions. Dynamic frequency reuse may be leveraged by a central approach or by a distributed approach. Assigning resources to the base stations by means of a central controller achieves a more efficient resource utilization, at the expense of higher complexity in the network infrastructure and additional signaling. In a distributed approach, where each base station autonomously carries out the resource allocation, as it is, for example, described in references [8] to [12] the base stations may individually access a predefined number of sub-bands, however, this greatly restricts the possibility of a sub-band reassignment in case the interference conditions change.

In Long-Term Evolution (LTE)-Advanced (LTE-A), a carrier aggregation is utilized. Multiple blocks of LTE bandwidth, named component carriers (CCs), are merged to obtain a broader usable spectrum, as is described in references [13] and [14]. This carrier aggregation provides an additional degree of freedom which can be exploited in interference mitigation techniques, for example by optimizing the selection of subsets of available CCs among the contending base stations. In references [15] to [17] CC selection schemes relying on the interference environment of base stations in an LTE-A system are described, however, these approaches result in excessive signaling between the base stations and do not offer any explicit protection of cell-edge mobile stations in densely deployed uncoordinated networks.

SUMMARY OF THE INVENTION

According to an embodiment, a method for controlling operation within a cell of a wireless cellular network, the wireless cellular network including a plurality of cells, each cell including a base station for serving one or more mobile users, may have the steps of: controlling an operation within the cell using a fuzzy logic, wherein input variables for the fuzzy logic include input variables determined on the basis of information only locally available in the cell, wherein the operation to be controlled within the cell includes resource and power allocation, characterized in that resource and power allocation to a user served by the base station of a cell is performed on the basis of interference information about an interference incident from one or more neighboring cells, the input variables for the fuzzy logic being determined on the basis of interference information only locally available in the cell, and the base station allocates resource blocks such that a desired signal to the user is obtained, the interference incident from one or more neighboring cells is reduced or minimized, and a rate requirement of the user in the cell is fulfilled, wherein the locally available information include a necessitated rate of the user; a quality or strength of the desired signal; a level of interference incident on the resource blocks; and a frequency-selective fading profile.

Another embodiment may have a non-transitory computer program product including instructions stored on a machine-readable medium for performing the inventive method, when the instructions are executed on a computer.

According to another embodiment, a base station of a cell of a wireless cellular network, the wireless cellular network including a plurality of cells, each cell including a base station for serving one or more mobile stations, may have: a fuzzy logic for controlling an operation within the cell using the fuzzy logic, wherein input variables for the fuzzy logic include input variables determined on the basis of information only locally available in the cell, wherein the operation to be controlled within the cell includes resource and power allocation, characterized in that resource and power allocation to a user served by the base station of a cell is performed on the basis of interference information about an interference incident from one or more neighboring cells, the input variables for the fuzzy logic being determined on the basis of interference information only locally available in the cell, and the base station allocates resource blocks such that a desired signal to the user is obtained, the interference incident from one or more neighboring cells is reduced or minimized, and a rate requirement of the user in the cell is fulfilled, wherein the locally available information include a necessitated rate of the user; a quality or strength of the desired signal; a level of interference incident on the resource blocks; and a frequency-selective fading profile.

Another embodiment may have a wireless cellular network, including a plurality of cells, wherein one or more of the cells include an inventive base station.

The present invention provides a method for controlling operation within a cell of a wireless cellular network, the wireless cellular network comprising a plurality of cells, each cell including a base station for serving one or more mobile users, the method comprising:

controlling an operation within the cell using a fuzzy logic, wherein input variables for the fuzzy logic comprise input variables determined on the basis of information only locally available in the cell.

In accordance with embodiments the control is performed at the base station independent from one or more neighboring base stations in the wireless cellular network.

In accordance with embodiments the control is performed at the base station individually without a communication regarding the control with one or more neighboring base stations in the wireless cellular network.

In accordance with embodiments the operation to be controlled within the cell comprises one or more of resource and power allocation, modulation and coding rate, and MIMO transmission scheme.

In accordance with embodiments the operation to be controlled within the cell comprises resource and power allocation, and resource and power allocation to a user served by the base station of a cell is performed on the basis of interference information about an interference incident from one or more neighboring cells, the input variables for the fuzzy logic being determined on the basis of interference information only locally available in the cell.

The base station may perform the resource and power allocation to the user independent from one or more neighboring and/or interfering base stations in the wireless cellular network.

The base station my perform the resource and power allocation to the user individually without a communication regarding the resource and power allocation with one or more neighboring and/or interfering base stations in the wireless cellular network.

The base station may allocate resource blocks such that a desired signal to the user is obtained, the interference incident from one or more neighboring cells is reduced or minimized, and a rate requirement of the user in the cell is fulfilled.

The locally available information may comprise:
a necessitated rate of the user;
a quality or strength of the desired signal;
a level of interference incident on the resource blocks; and
a frequency-selective fading profile.

The necessitated rate of the user my determine the number of resource blocks that need to be assigned, the strength of the desired signal may determine the necessitated transmit power, the level of interference incident on the resource blocks may determine the allocatability of each resource block, and the selection of resource blocks to be allocated may depend on the frequency-selective fading profile.

The necessitated rate, the quality or strength of the desired signal, the level of interference incident on the resource blocks, and the frequency-selective fading profile may be locally available at the base station in the reverse link, and at the user in the forward link.

The base station may evaluate which resource blocks are most suitable to be allocated to the user in a particular time slot, and determine the transmit power on the allocated resource blocks to generate a necessitated signal-to-interference-plus-noise ratio (SINK) in accordance with the necessitated rate.

The base station may use the fuzzy logic to determine the allocatability of each resource block in each time slot on the basis of the locally available information.

The input variables of the fuzzy logic may comprise:
the necessitated rate of the user which is defined by the service demanded by the user, the values for the necessitated rate being "Low", "Low-medium", "Medium-high" and "High";
the strength of the desired signal, the values for the strength of the desired signal being "Low", "Medium" and "High";
the level of interference which indicates the interference environment for each user on each resource block, the values for the level of interference being "Low", "Medium" and "High"; and
the frequency-selective fading profile, the values for the frequency-selective fading profile being "Deep", "Average" and "Peak".

The output variables of the fuzzy logic may comprise:
a resource block allocation for the user, wherein the allocatability of each resource block is calculated by the fuzzy logic depending on the values of the input variables; and
the transmit powers of the resource blocks assigned to the user, wherein each resource block transmits with either half or full power, depending on the values of the input variables.

The method may further comprise, in each time slot, allocating the most applicable resource blocks and transmit power according to the fuzzy logic rules to the user and performing data transmission.

The method may further comprise, based on received signal levels from the user and from interfering mobile stations, updating the locally available interference information regarding the level of interference incident on the resource blocks and the frequency-selective fading profile to more accurately represent the long-term interference and fading environments of the cell, and using the updated information in a following time slot for the resource and power allocation.

In accordance with embodiments, the method further comprises performing the control in a plurality of cells of the wireless cellular network, thereby continuously individually optimizing the control so that for the plurality of cells of the wireless cellular network a stable global solution is reached in accordance with which the one or more users in each cell are satisfied.

The wireless cellular network may comprise a macro cell network, a pico cell network or a femto cell network.

The present invention provides a base station of a cell of a wireless cellular network, the wireless cellular network comprising a plurality of cells, each cell including a base station for serving one or more mobile stations, comprising:
a fuzzy logic for controlling an operation within the cell using the fuzzy logic,
wherein input variables for the fuzzy logic comprise input variables determined on the basis of information only locally available in the cell.

The present invention provides a wireless cellular network, comprising a plurality of cells, wherein one or more of the cells comprise the base station in accordance embodiments of the invention.

Thus, in accordance with the present invention an approach is taught for operating a cell of a wireless cellular network without necessitating an explicit coordination/communication with neighboring cells. In accordance with embodiments of the invention, this is achieved by applying the fuzzy logic theory to combine information that is only locally available in the cell so that the operation within the cell can be controlled on the basis of the output of the fuzzy logic without necessitating any coordination or communication with neighboring cells. With other words, the operation, by means of the fuzzy logic using information that is only locally available, allows for a control of the operation autonomously and individually at a base station, e.g., in a densely deployed wireless network.

Embodiments of the invention are advantageous over conventional approaches as a simple and low-complexity approach is used which only necessitates locally available information. Consequently, the control of the operation is performed autonomously and without a central network controller, i.e., a distributed control is carried out. No coordination/communication between base stations is necessitated Thereby eliminating any specific signaling. Also CCI within a network is minimized. Further improvements are that no backhaul is needed, i.e. embodiments of the invention can be applied to any unplanned network, no loss of efficiency occurs which is typically caused by resource partitioning techniques, and there is no need for additional signaling as calculations are performed independently in the respectively base stations.

In accordance with embodiments a distributed and autonomous technique for resource and power allocation in cellular networks is presented, and resource blocks (RBs) and the corresponding transmit powers are assigned to the users in each cell of the network individually without explicit coordination between the base station. This "allocatibility" of each resource is determined using only locally available information Thus, a decentralized, autonomous interference coordination scheme is provided that operates independently on each cell, utilizing only local information and achieving an efficient/near-optimal solution for the entire network. By allowing base stations (of all types, for example, macro-cell base stations, pico-cell base stations, femto-cell base stations) and mobile stations to individually optimize the resource allocation and transmission power, a global optimum may be found without any centralized algorithm governing the system. This reduces not only the amount of signaling but also the operation complexity of the network.

In accordance with embodiments a fuzzy logic system is utilized to allow for an autonomous resource allocation given locally received parameters from the system. Each parameter is fuzzified such that its "value" can be obtained given a certain input. The obtained values for the different input parameters are combined using well-defined rules of how each parameter effects the resource block choice of the mobile station. The results of the rules are then compounded and defuzzified to indicate to the mobile station whether a particular resource block location is profitable or is not profitable. In accordance with embodiments, the necessitated and locally available information utilized in the fuzzy system are
- the necessitated rate of the user which determines the number of resource blocks (RBs) to be assigned,
- the quality (i.e. strength) of the desired signals which dictates the necessitated transmit power,
- the level of interference incident on the resource blocks which strongly influences the allocatibility of each resource block, and
- the frequency-selected fading profile, which also effects the resource blocks to be allocated.

All of these variables are locally available at the base station in the reverse link and at the mobile station in the forward link, so that it is not necessary to obtain or exchange any extra information among neighboring base stations, which may be base stations from the same kind of cells, for example neighboring macro-base stations or femto-cell base stations or which may be neighboring base stations from different cells, for example, base stations from a macro-cell and a femto-cell or from a femto-cell and a pico-cell.

Using a fuzzy logic system, the time-average values of each of these inputs may be combined to determine which RBs are most suitable to be allocated in a particular cell, i.e. which resource can be allocated such that the user rate(s) in the cell is/are satisfied/maximized. In accordance with these embodiments, it is possible to perform ICIC without the need for a backhaul connection, for a resource partitioning (restriction of time-frequency resource usage among claims) or component carrier selection.

In accordance with embodiments of the invention, an operation within the cell comprises resource and power allocation, as it might be used for ICIC, but also concerns controlling a modulation and coding rate, for example MCS, and a MIMO transmission scheme, for example in case of MIMO spatial multiplexing or spatial diversity.

BRIEF DESCRIPTION OF THE DRAWINGS

In the following, embodiments of the invention will be described in further detail on the basis of the accompanying drawings in which:

FIGS. 8A and 8B are graphical representations of the complete fuzzy logic resource power allocation approach as shown in FIGS. 4, 5 and 7;

FIG. 10 shows a table of the simulation parameters;

FIGS. 17A and 17B show the PDFs and the CDFs of the desired and interfering signal energies received in a densely deployed femto-cell network with conventional power control.

DETAILED DESCRIPTION OF THE PREFERRED EMBODIMENTS

Figure 1:
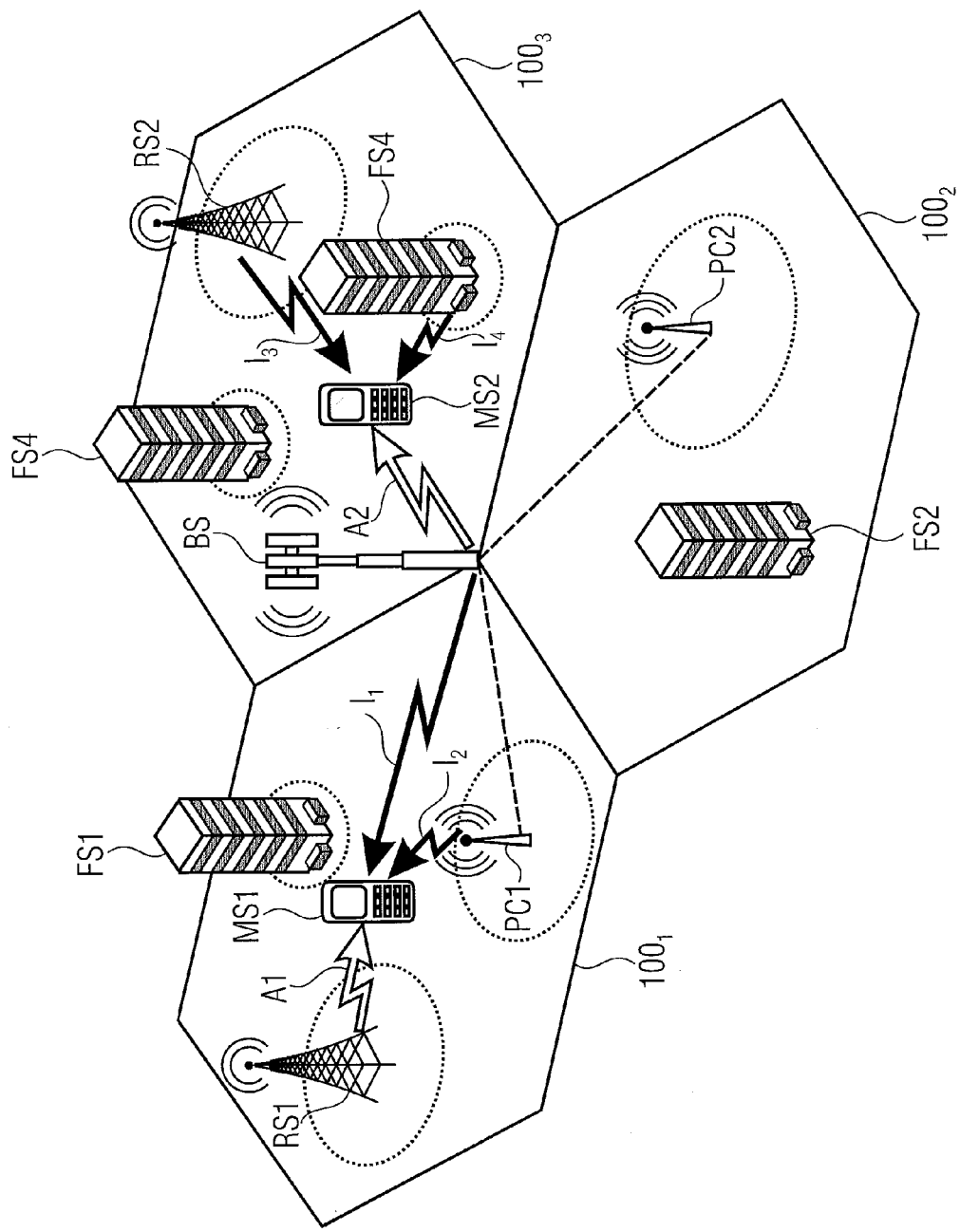
FIG. 1 shows a schematic representation of an exemplary heterogeneous network, more specifically a densely deployed HetNet scenario.
Figure 2:
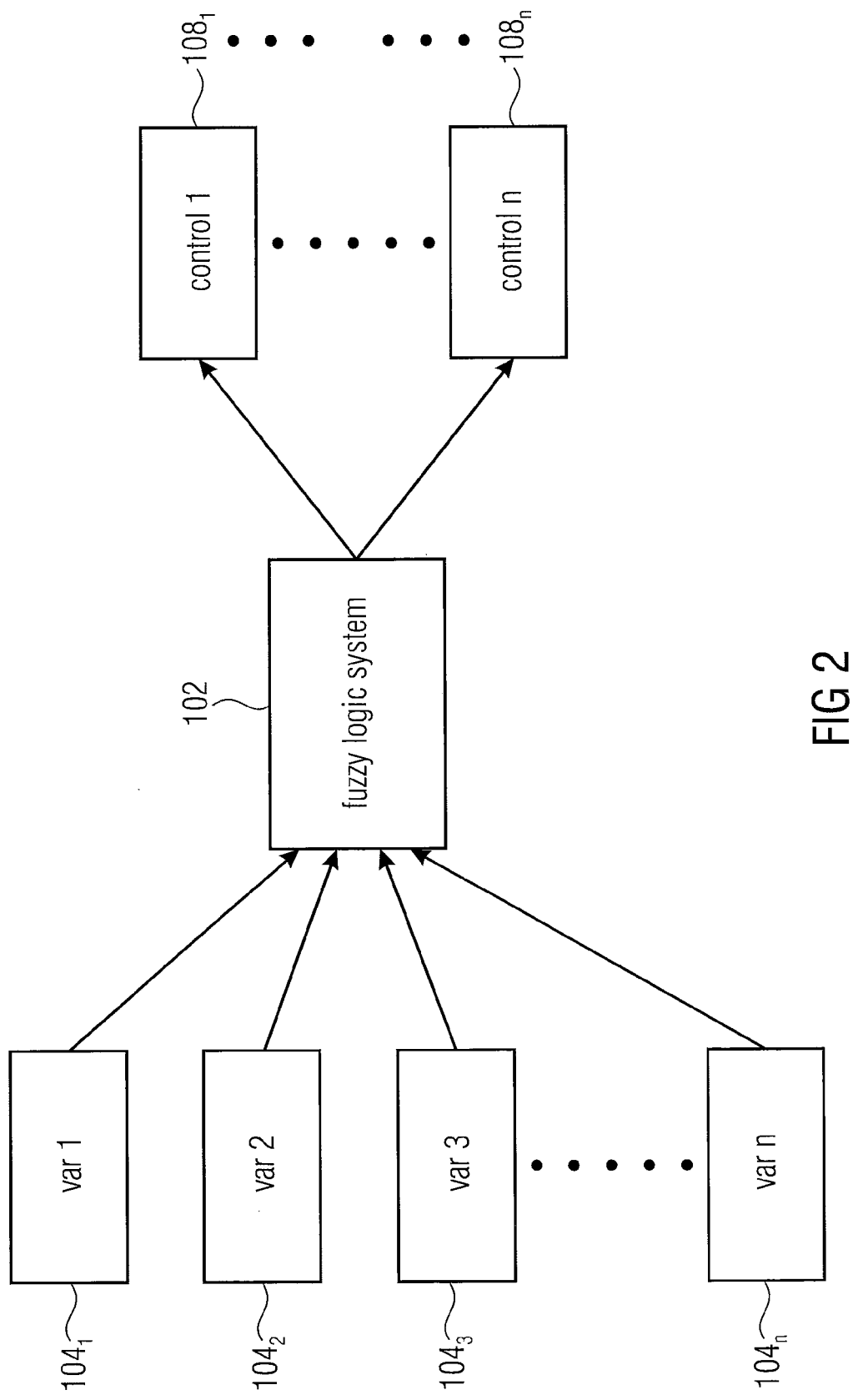
FIG. 2 shows a simplified graphical representation of an embodiment of the invention for controlling operation within a cell of a wireless cellular network, for example a cell as it is depicted in FIG. 1.

FIG. 2 shows a simplified graphical representation of the an embodiment of the invention for controlling operation within a cell of a wireless cellular network, for example a cell as it is depicted in FIG. 1. A fuzzy logic system 102 receives one or more input variables $104_1$ to $104_n$ (VAR1 to VARn). On the basis of the input variables $104_1$ to $104_n$ the fuzzy logic system 102 controls the operation within the cell, more specifically one or more control operations control $108_1$ to $108_n$, which may be carried out on the basis of the output of the fuzzy logic system 102. The system depicted schematically in FIG. 2 may be provided in each of the base stations of the respective cells shown in FIG. 1, for example, it may be provided within the base station BS of the overall cell 100 or at the base stations of the pico- and femto-cells shown schematically in FIG. 1. All or at least some of the base stations (of the macro-cell, the pico-cell and/or the femto-cell) may include such a logic and the variables $104_1$ to $104_n$ are variables which are only locally available in the cell. Control of the cell can be performed without the need for any communication or signaling with neighboring cells. In accordance with embodiments, the operation to be controlled within the cell may comprises one or more of the control of the resource and power allocation, the control of the modulation and encoding rate, and the control of the MIMO transmission scheme. One or more of these may be controlled on the basis of the system as depicted in FIG. 2 and implemented at the respective base station as outlined above.

In the following, an embodiment for controlling operation within a cell of a wireless cellular network will be described in further detail on the basis of an approach for an interference coordination within such a cell. It is noted that the invention is not limited to controlling interference coordination but it may also be used for controlling a modulation and coding rate or for controlling a MIMO transmission scheme.

Interference coordination necessitates the allocation of resource and power to users in the cell of the wireless network and, as has been discussed above, there might be situations, for example in case of a femto network, where no backhaul connection between respective base stations of different femto-cells exists so that there is hardly any possibility for exchanging information between the femto-cell base stations. Also, in case of pico-cell networks or macro-cell networks, there are situations where no communication between base stations of neighboring cells or interfering cells is possible or desired. As mentioned above, the ICIC protocol necessitates information from neighboring base stations which may not be available. For dealing with such a situation, in accordance with this embodiment, a fuzzy logic ICIC approach is taught which is basically a distributed and autonomous technique for resource and power allocation in a cellular network, wherein the allocatability of each resource is determined utilizing only locally available information, so that it is not necessary to communicate between other base stations with regard to the resource and power allocation. On the basis of this locally available information, the fuzzy logic generates output variables for controlling allocation of resources and power within the cell without the need for communicating with neighboring base stations.

Further details of this embodiment will now be described with regard to a femto-cell environment, however, it is noted that the invention is not limited to femto-cells, rather, the approach described in the following may be applied equally to other cells, like macro-cells and/or pico-cells.

Femto-cell environments allow for a deployment of the respective base stations by the user, and in view of this user-side or customer-side random deployment of femto-cells and the resulting lack of fixed connective infrastructure, there cannot be any guarantee that femto-cell base stations are able to communicate with each other over a wired backbone. Further, it is not desired to form inter-base station communication/coordination over the wireless medium as this is already scarcely available, and increasing the control channel bandwidth is inherently difficult. Therefore, in accordance with this embodiment, a distributed autonomous interference coordination is provided that necessitates no additional signaling between the femto-cell base station.

Figure 3:
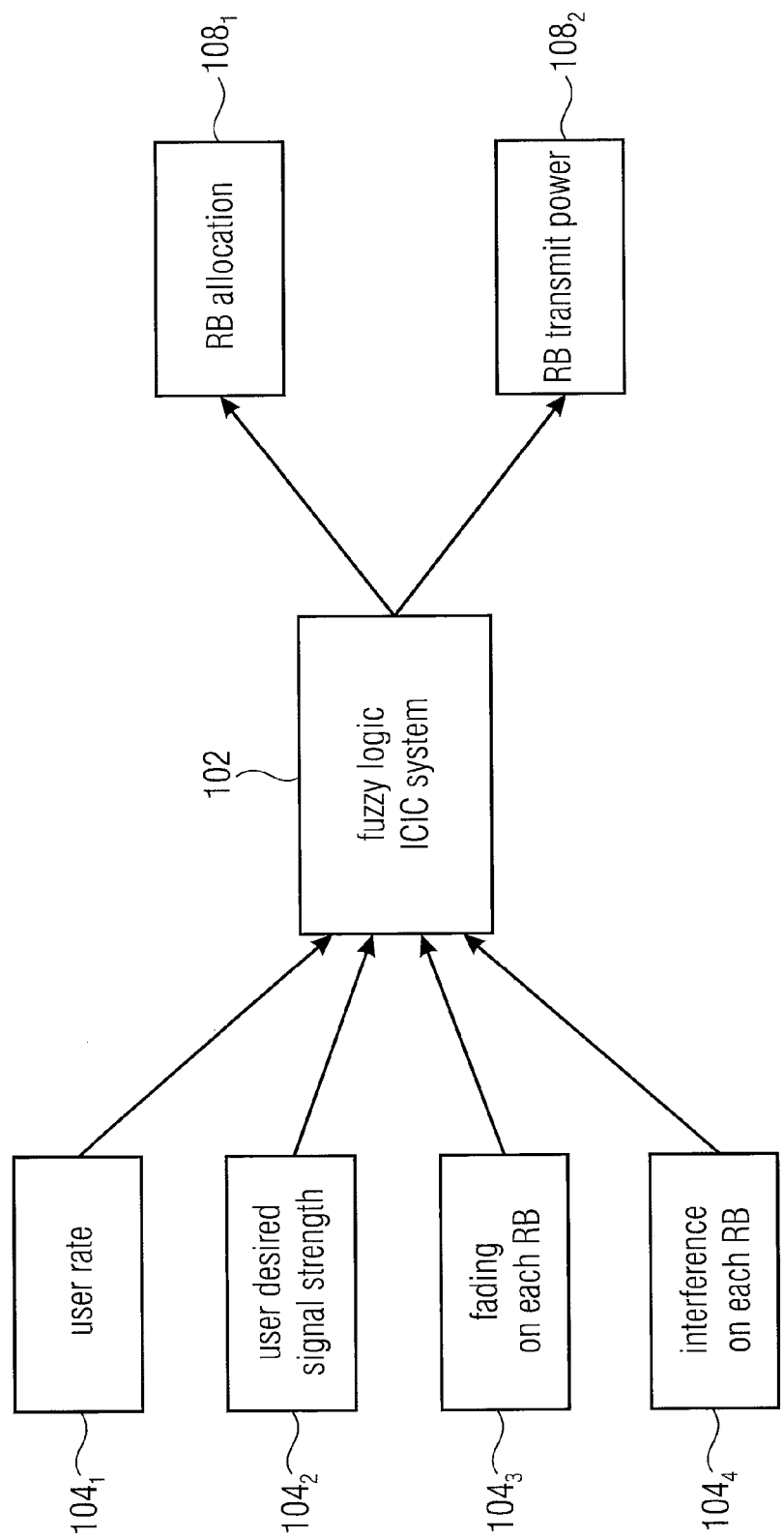
FIG. 3 shows a simplified graphical representation, similar to the one of FIG. 2, for implementing an autonomous resource and power allocation technique.

FIG. 3 shows a simplified graphical representation, similar to the one of FIG. 2, for implementing an autonomous resource and power allocation technique. The fuzzy logic system 102 is a fuzzy logic ICIC system receiving four input variables $104_1$ to $104_4$ and providing output $108_1$ to $108_2$ for controlling operation of the femto-cell, more specifically for controlling the resource block allocation and the resource block transmit power. Without inter-base station communication, the femto-cell base station needs to perform the resource and power allocation on the basis of locally available information only. To maximize the performance in its own cell, the femto-cell base station needs to attempt to allocate resource blocks such that the desired signal on the resource block is maximized, while the interference impedance from neighboring cells is minimized. Further, the base station needs to allocate enough resource so that the rate requirements of the user(s) in the femto-cell are fulfilled. Therefore, in accordance with the described embodiment, the necessitated, and locally available, information or input variables for the fuzzy logic ICIC system 102 depicted in FIG. 3 are:

the necessitated rate of the user (user rate $104_1$) which determines the number of resource blocks that need to be assigned, the quality (user desired signal strength $104_2$) of the desired signal which dictates the necessitated transmit power, the frequency-selective fading profile (fading on each resource block $104_3$) which effects the resource blocks to be allocated, and the level of interference incident on each resource block (interference on each resource block $104_4$) which strongly influences the allocatablity of each resource block.

All of these variables are locally available at the femto-cell base station in the reverse link, and at the mobile station(s) in the forward link, so that it is not necessary to exchange any additional information between the base stations of neighboring cells and the base station of the current cell. On the basis of these input variables the fuzzy logic ICIC system 102, controls the resource block allocation and the transmit power for the resource block allocated. More specifically, it is evaluated which resource block(s) is/are most suitable to be allocated to the mobile station in a particular time slot. The system further determines the transmit power on these resource block(s) to generate the necessitated signal-to-interference-plus-noise ratio (SINR) such that the user's rate can be met. A resource block receiving little or no interference and situated in a fading peak is more suitable for allocation to the femto-user, whereas any resource block(s) receiving high interference or experiencing deep fades is/are much less appropriate.

As can be seen from FIG. 3, the fuzzy logic system 102 is used to determine the allocatability of each resource block in each time slot from the given input information. In the fuzzy logic 102 the (continuous) input range is divided into multiple "membership functions" which give a coarse evaluation of the variable. For example, one might evaluate water temperature (range from 0-100° C.) to be "cold" below 50° C." and "hot" above 50° C. However, it is clear that water at 45° C. is by no means cold, and water at 55° C. is not fully hot. A fuzzy logic, therefore, divides the range into 0-30° C. ("cold"), 30-65° C. ("warm") and 65-100° C. ("hot"), which is obviously a more accurate description of the water temperature. In a similar manner, the level of interference can be determined as "high", "low", or "medium", just as the RB fading value can be split up into "peak", "deep", or "average". By combining the membership values of the input through various rules, the allocatability of each resource block is determined. The output is also "fuzzy", indicating how suitable a resource block is for a location given the current inputs, or how unsuitable it is, while avoiding a hard yes/no decision. By means of this approach, a scheduler can allocate the "most appropriate" resource block(s) according to the fuzzy logic rule.

In each time slot, the femto-cell base station allocates the most appropriate resource blocks to the mobile station and a data transmission is performed. Based on the received signal levels from the desired user (mobile station) and from interfering mobile stations, the femto-cell base station updates information to more accurately represent the long-term interference and fading environment of its cell. This updated information is utilized in the next time slot to again carry out the resource and power allocation which is now further improved in view of the update information. The same operation is performed in all femto-cells in the scenario, and the resource block allocations are continuously individualized so that the system may converge to a stable global situation in which the user(s) in each cell is/are satisfied.

The key advantages of the above-mentioned embodiment are that a simple and low-complexity resource allocation is performed using locally available information only. Consequently, ICIC is performed autonomously and without a central network controller, i.e., is performed in a distributed manner. No coordination/communication between base stations is necessitated, thereby eliminating signaling therebetween. CCI within the femto-tier is minimized due to the complementary RB allocation, and transmit power control will drastically reduce the interference to the macro-tier.

In the following, further details of the embodiment implementing an ICIC technique in a femto-cell environment will be described. Because femto-cellular networks cannot be guaranteed to include backhaul connections, standard ICIC techniques that employ inter-cell information signaling cannot be implemented. Therefore, the above-described autonomous and distributed interference coordination technique is implemented that performs resource allocation and power control given locally available information only. To facilitate such an ICIC mechanism, fuzzy logic is used to classify the values of the various inputs on all resource blocks, and hence determine the suitability of each resource block to be allocated to the user(s) in the cell. No coordination/communication between femto-cell base stations occurs, and hence each cell optimizes its own efficacy within the goal of an optimum network performance. A detailed description of the system will now be given, starting with a description of the inputs of the fuzzy logic system, a further description of the functionality of the actual fuzzy logic system and the outputs thereof. Following this, the actual scheduling will be described.

Figure 4:
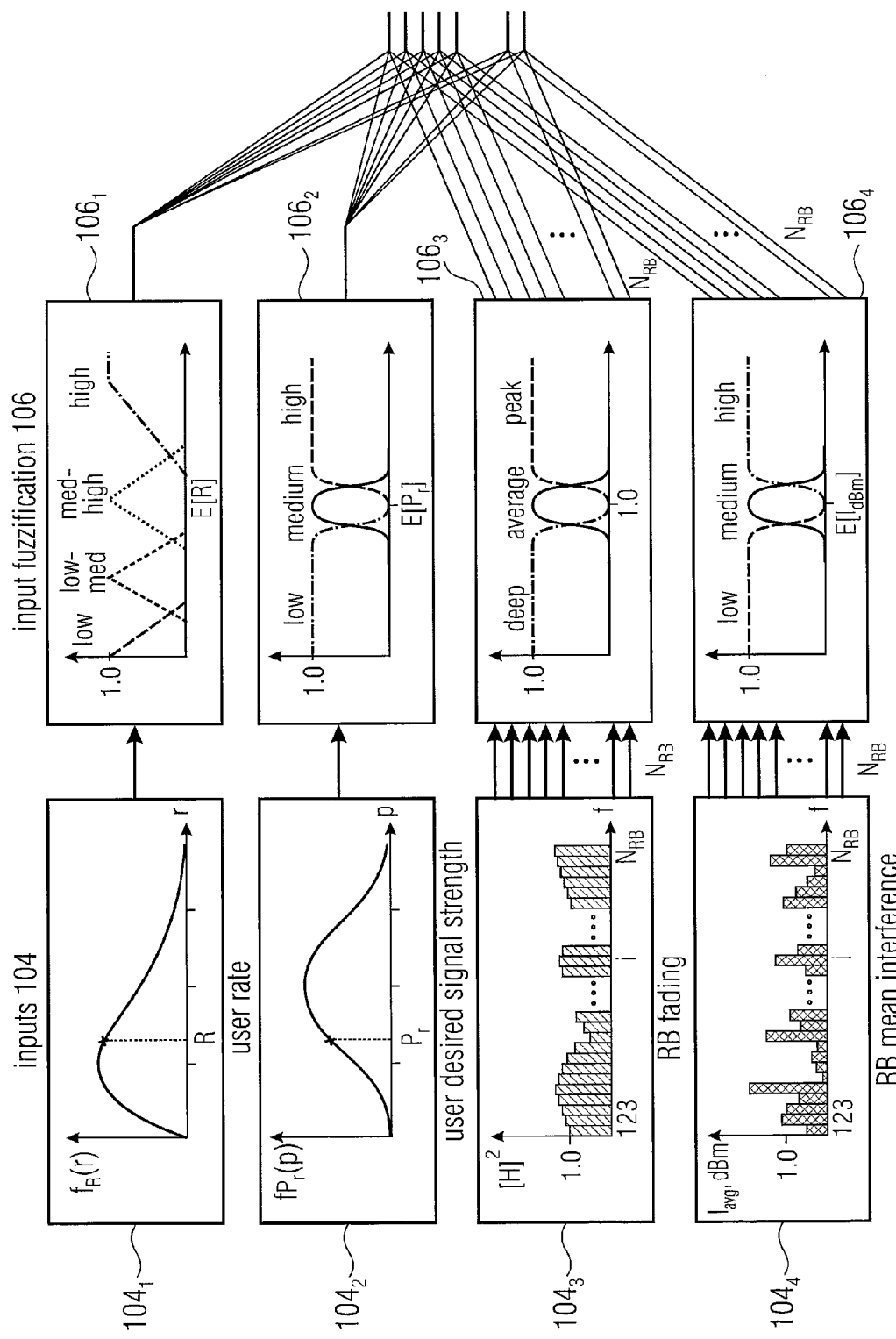
FIG. 4 is a graphical representation of the fuzzy logic resource and power allocation inputs and the associated input fuzzification.

FIG. 4 is a graphical representation of the fuzzy logic resource and power allocation inputs 104 and the associated input fuzzification 106. In accordance with the currently described embodiment, the input variables 104 considered in the fuzzy logic system 102 are as follows:

The necessitated rate $104_1$ of the mobile station, which is defined by the service demanded by the user. The input fuzzification $106_1$ divides the range of the user rate $104_1$ into different values. In this embodiment, the values "low", "low-medium", "medium-high", and "high" are used to categorize the necessitated rate $104_1$ requested by the user. These ranges are dependent on the user scenario, for example, in femto-cells a higher rate can be requested due to the superior channel conditions. The necessitated rate is a per-user requirement and thus is considered equal for all resource blocks.

The received desired signal level $104_2$ describes the transmission condition from the transmitter to the receiver, i.e. the stronger the desired signal, the better the channel quality between the transmitter and the receiver, for example due to a smaller transmitter-receiver distance. By means of the input fuzzification $106_2$ the signal power domain is divided into "low", "medium", and "high" values to sort users depending on their useful channels. The cutoff points and slopes of the values are determined from cumulative distribution functions (CDFs) as will be described later. Since the fast fading component is considered a separate input variable, the designated signal level is described for the user and is also considered equal to all resource blocks to be allocated to the user.

The fast fading component $104_3$ for each resource block may not be readily available at the mobile station, however, it can become accessible via sounding or pilot/data transmission over multiple time slots. An additional (for example per mobile station) frequency selective fading profile extends over the available bandwidth, and hence certain resource blocks are more suitable for the mobile station than others; or than to other mobile stations. The input fuzzification $106_3$ divides the fast fading domain into "deep", "average", and "peak" values, centered around the mean fading component level. In general, a mobile station will choose to avoid resource blocks with "deep" fades and try to acquire resource blocks with "peak" fading values, provided these do not suffer from too much interference.

The level of interference $104_4$ illustrates the immediate interference environment for each mobile station on each resource block. Resource blocks with strong interference can indicate a very near neighboring cell currently utilizing them, even multiple interfering neighboring cells. Low or zero interference resource blocks will obviously be very attractive to the mobile station. The input fuzzification $106_4$ divides the interference power domain into "low", "medium", and "high" values to categorize resource blocks by the amount of interference they suffer. The cutoff points and slopes of the values are determined from the CDFs as will be described later.

Figure 5:
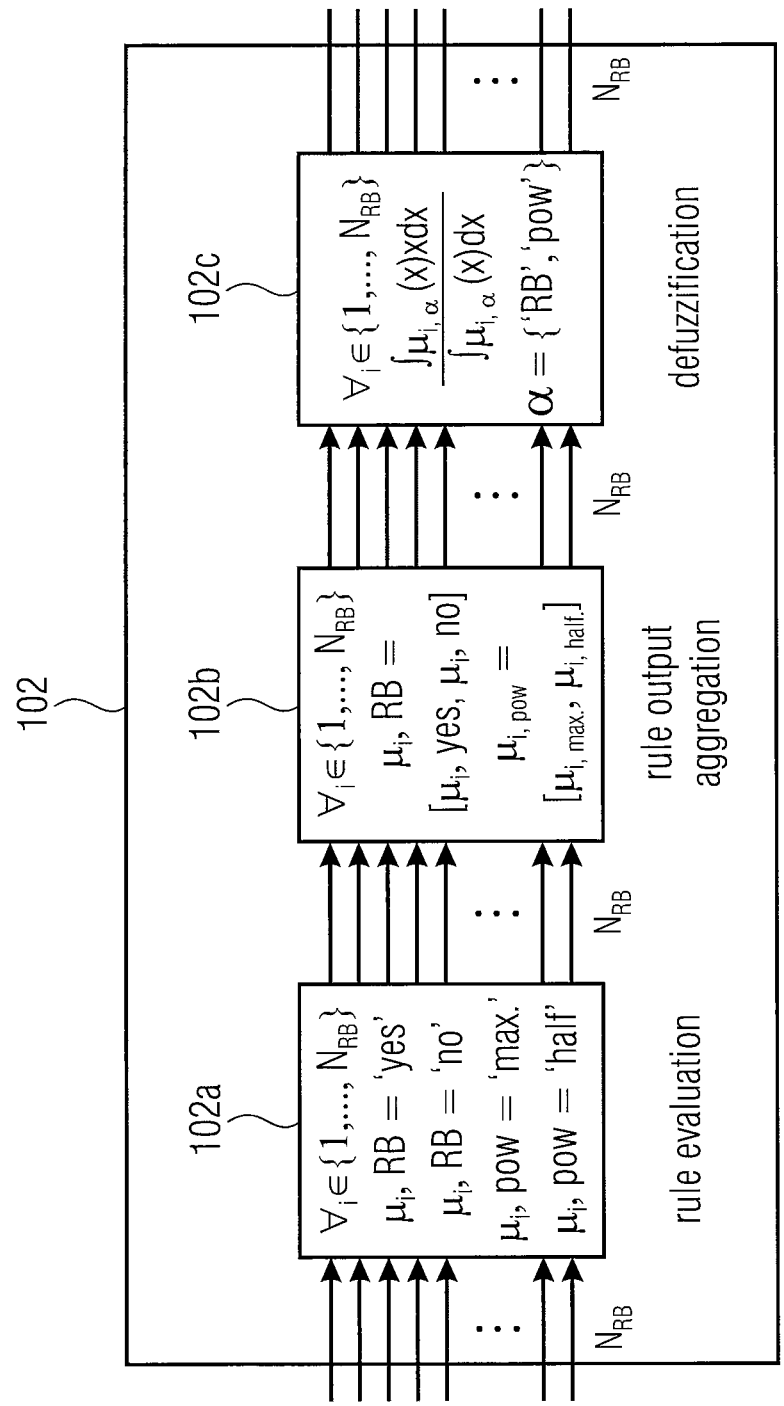
FIG. 5 is a graphical representation of the fuzzy logic resource power allocation system, which receives values from the input fuzzifications of FIG. 4.
Figures 6, 7:
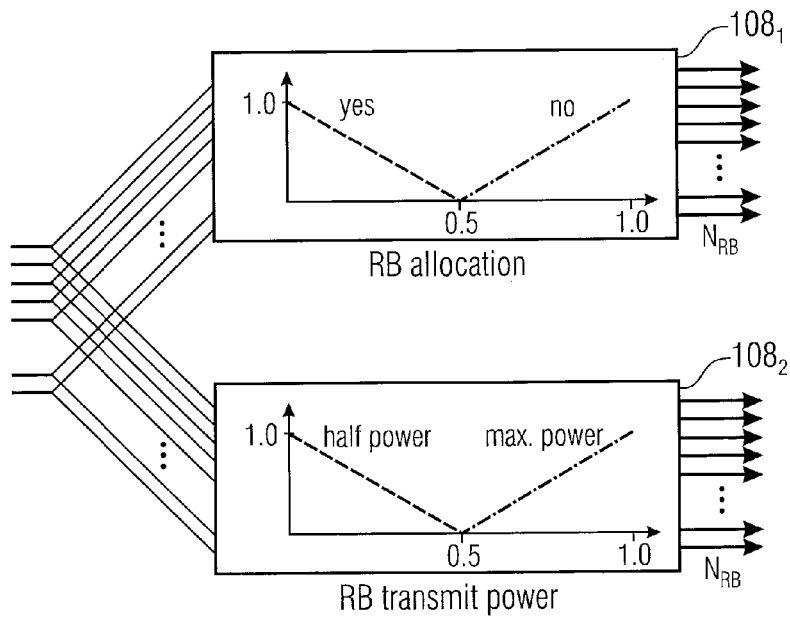
FIG. 6 shows a table of a fuzzy rules governing the conversion of the fuzzified inputs into resource and power allocation decisions/recommendations.
FIG. 7 is a graphical representation of the fuzzy logic resource and power allocation outputs of the system in accordance embodiments of the invention, which receives values from the defuzzification of FIG. 5.

The fuzzy logic system 102 is responsible for determining the allocatability of each resource block in the cell, and the power at which each resource block will be transmitted. FIG. 5 is a graphical representation of the fuzzy logic resource power allocation system 102. Allocating the resource blocks and the power at which they should be transmitted is performed in three stages. The fuzzified values 106 of inputs 104 (see FIG. 4) are fed into the rule evaluation stage 102a, where these values are combined to determine the "scores" of the membership functions of the outputs. FIG. 6 shows a table of a fuzzy rules governing the conversion of the fuzzified inputs 106 into resource and power allocation decisions/recommendations. Most of these rules are self-explanatory. In essence, they are intuitive guidelines as to why a specific resource block should be assigned to the mobile station or not, for example, allocating a resource block that is receiving high interference (see rows 3 and 6 of the table) is not beneficial except in certain cases; or allocating a medium-interference resource block should not be done if the necessitated rate is too high or the signal level is too low (see rows 4 and 5 of the table). Finally, almost any resource block with low interference can be allocated and be transmitted with half power to achieve the desired rate (see row 1) of the table in FIG. 6.

In a subsequent stage, the rule output aggregation stage 102b (see FIG. 5), the results of all rules obtained from the rule evaluation stage 102a are combined for each resource block to yield a fuzzy set representing how much a resource block should or should not be allocated, and how much it should or should not transmit at half power (that is, if the majority of the rules "yield" for a resource block allocation, then the resource block will be allocated more than it should not be).

The system 102 further comprises a defuzzification stage 102c for calculating the center of gravity (which is for example calculated using an integral quotient, as is shown in the block 102c of FIG. 3) of the fuzzy set of each resource block to produce a single score indicating which membership functions of the output are recommended by the system. In essence, this stage determines finally the resource block allocation (yes/no) and the resource block transmit power (half/max), for example, a resource block allocation score of 0.25 indicates a "yes", and a resource block transmit power score of 0.6 recommends maximum power transmission. A resource block with an allocation score of 0.1 is much more allocatable than one with a score of 0.4.

FIG. 7 is a graphical representation of the fuzzy logic resource and power allocation outputs $108_1$ and $108_2$ of the system in accordance embodiments of the invention. The system outputs are the recommended allocation and power for each of the resource blocks, and the most "allocatable" resource blocks, i.e. the resource blocks with the lowest resource block allocation score, are assigned to the mobile station. As is depicted in FIG. 7, the output variables of the fuzzy logic system 102 comprise:

The RB allocation $108_1$ for the mobile station. The allocatability of each resource block is calculated by the fuzzy logic system 102 depending on the input parameters 104. In the end, the mobile station assigns its necessitated number of resource blocks choosing those that are most suitable for it. Hence, while it is a simple "yes"/"no" decision, the score (from zero to one) of the output describes which resource blocks are best allocated to the mobile station. The lower the score, the better.

The transmit powers $108_2$ of the resource blocks assigned to the mobile station. Each mobile block can transmit either half or full (maximum) power, depending on the input 104. For example, a resource block with a low interference may transmit at high power, whereas, if the mobile station's desired signal is low or the fading on the resource block is deep, full power should be utilized.

Figure 8B:
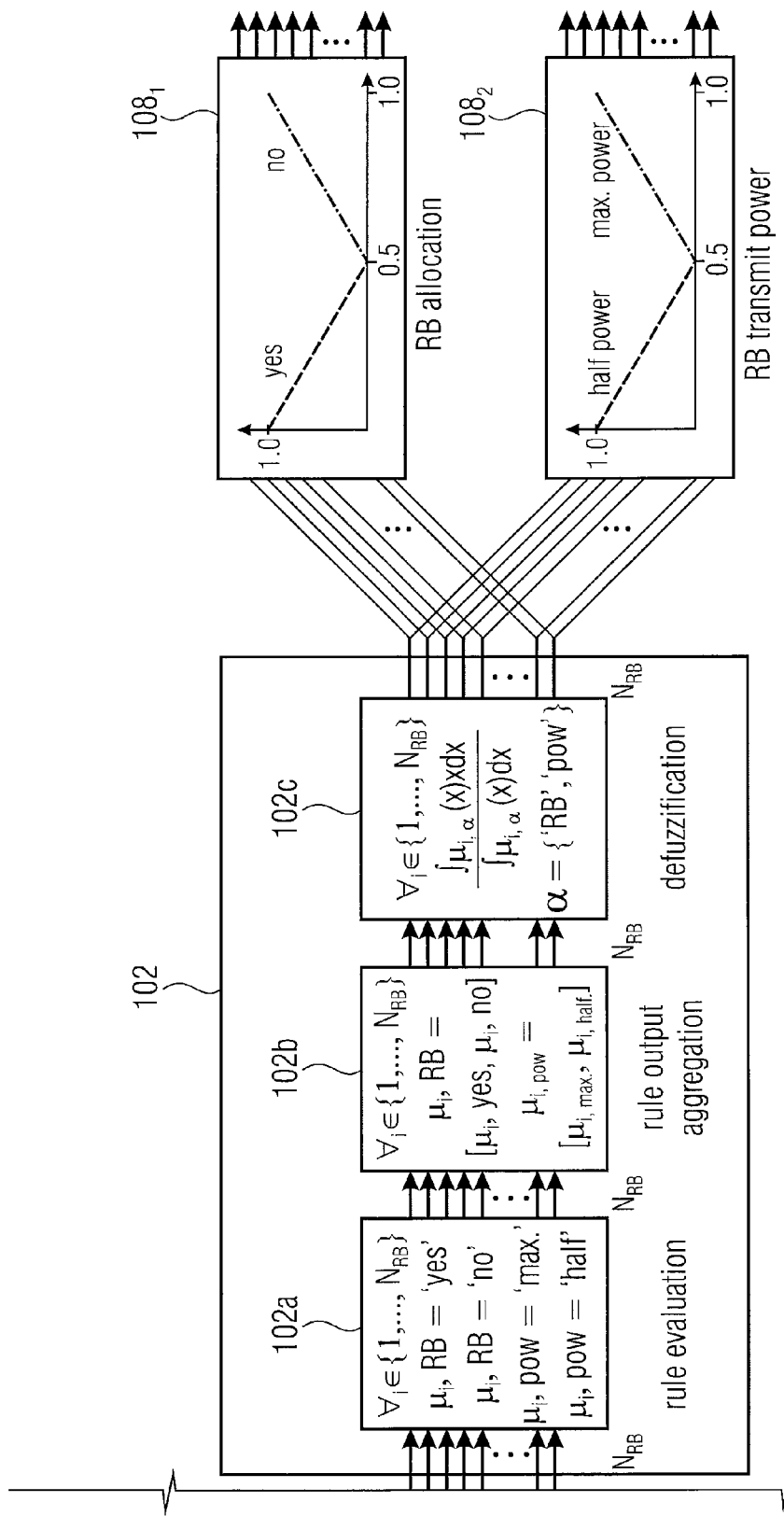

FIGS. 8A and 8B are graphical representations of the complete fuzzy logic resource power allocation approach as described above.

Further details of the scheduling in a femto-cell network are now described. It is a common assumption in femto-cell networks that there exists a single mobile station per cell. Therefore, no multi-user scheduling needs to be performed at the femto-cell base station, and the user can be allocated the resource blocks with the best scores, as determined by the fuzzy logic system 102. In the reverse link, the contiguity constraint, specific to LTE, is fulfilled by allocating the necessitated number of consecutive resource blocks with the least sum-score. Further, while there is no intelligent scheduling necessitated within the cell, overall with each femto-cell base station allocating the most suitable resource blocks, a natural frequency reuse will result. More specifically, it can be shown that neighboring femto-cell users are allocated orthogonal (i.e. non-overlapping) sets of resource blocks, whereas femto-cells that are further from each other (i.e. which are less interfering) may assign the same resource blocks without excessive interference penalties.

However, embodiments of the invention are also applicable for networks where multi-user scheduling is necessitated. There are many possibilities to perform resource allocation in the presence of multiple users. For instance, in the forward link a femto-cell base station may simply assign resource blocks in the ascending order of scores calculated for all mobile stations. This is a greedy approach, and may not be optimal in cases where the mobile stations have vastly differing channel conditions. Another possibility for a resource allocation may be a proportional fair scheduler, where the resource blocks' scores for each user are scaled by the ratio of achieved and desired rates. A mobile station that strongly underachieved its rate in one time slot would be allocated resource blocks before a mobile station that was close to its target rate. Also, a priority scheduler may be utilized to give precedence to the user with the highest necessitated rate/modulation order, such that it can more likely fulfill its QoS requirements.

Figure 9:
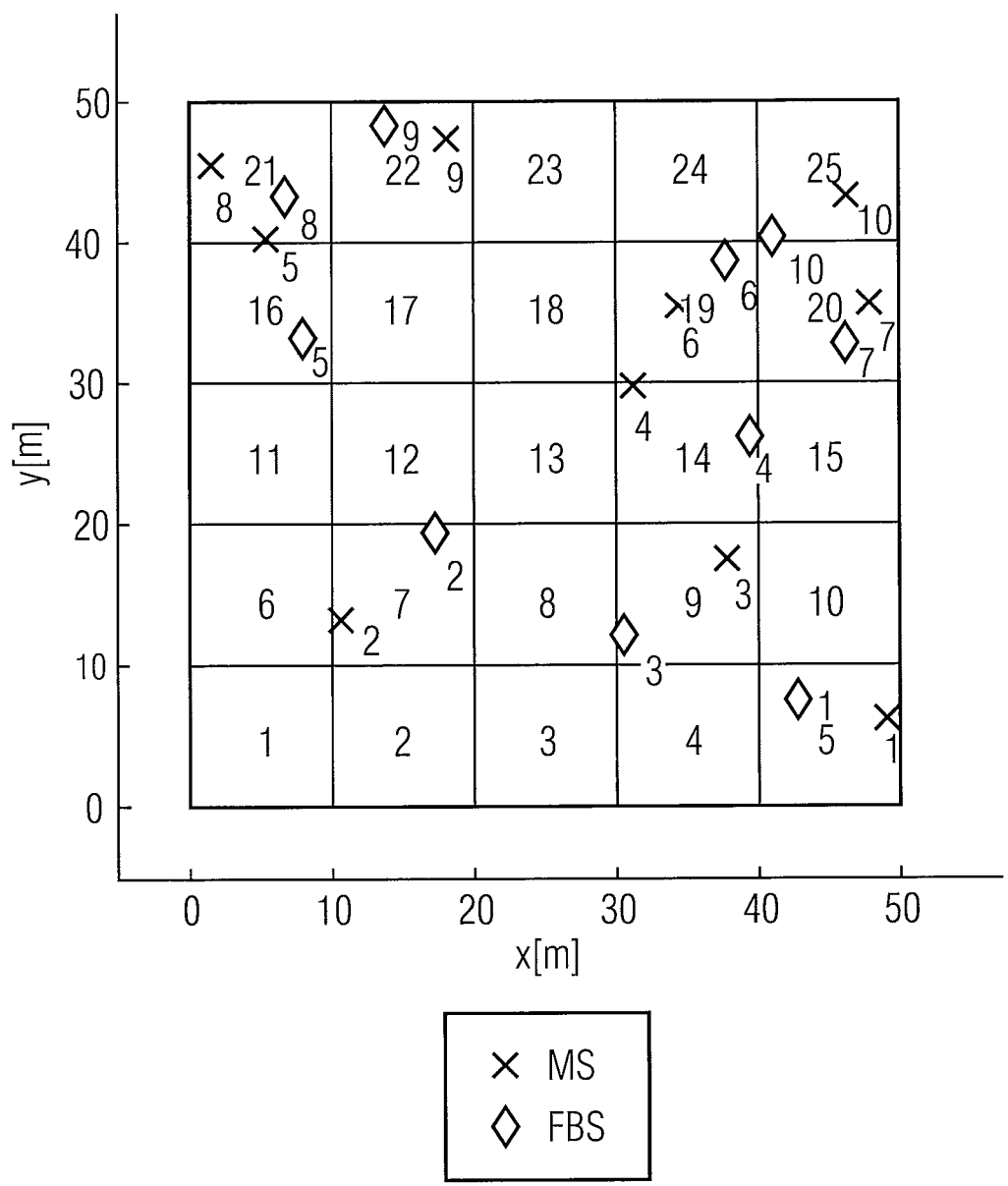
FIG. 9 is a schematic representation of an apartment block's scenario with 5×5 apartments in which a random number of apartments host an active femto-cell.

In the following, the performance of the above-described fuzzy logic ICIC system 102 will be described on the basis of a simulated femto-cell scenario. FIG. 9 is a schematic representation of an apartment block's scenario with 5×5 apartments in which a random number of apartments host an active femto-cell. As can be seen from FIG. 9, ten femto-cell base stations (FBS) are deployed, and also it is assumed that ten mobile stations (MS) are present. Each apartment has a probability $p_{act}$=0.5 to contain an active femto-cell base station. In each femto-cell the femto-cell base station and a single mobile station are distributed uniformly within the apartment. Monte-Carlo simulations are used to provide performance statistics in the area of throughput, availability, fairness and energy-efficiency. Due to the private deployment of femto-cells, a closed-access system is assumed in FIG. 8 and each mobile station is assigned to the femto-cell base station in its apartment, even if a foreign femto-cell exhibits superior link conditions. FIG. 10 shows a table of the simulation parameters. Each user necessitates a certain rate, drawn from a Rayleigh distribution of a mean 1 Mbps, and a minimum rate of 180 kbps. Each user has assigned a modulation order from 1 bit (BPSK) to 4 bits (64-QAM) per channel use. After each time slot, each mobile station re-allocates its resource blocks in accordance with the fuzzy logic ICIC system. Each simulation iterates through 2000 scenarios, for 25 time slots each. The probability of an active femto-cell base station ($p_{act}$) is 0.5, and a transmit power for each mobile station $p_{max}$ is 10 dBm.

The resource block and power allocation performed in accordance with the fuzzy logic operation in accordance with embodiments of the invention will now be compared to
   a "Random Almost-Blank Subframe (ABS) Transmission" technique in accordance with which a random resource block allocation is utilized, a maximum power is transmitted, and in each time slot, a user transmits an ABS with a probability $\Gamma_{ABS}$; for this simulation $\Gamma_{ABS}$=0.1.

a "Maximum Power Transmission" technique in accordance with which random resource block allocation is utilized and at maximum power is transmitted.

Figure 11A:
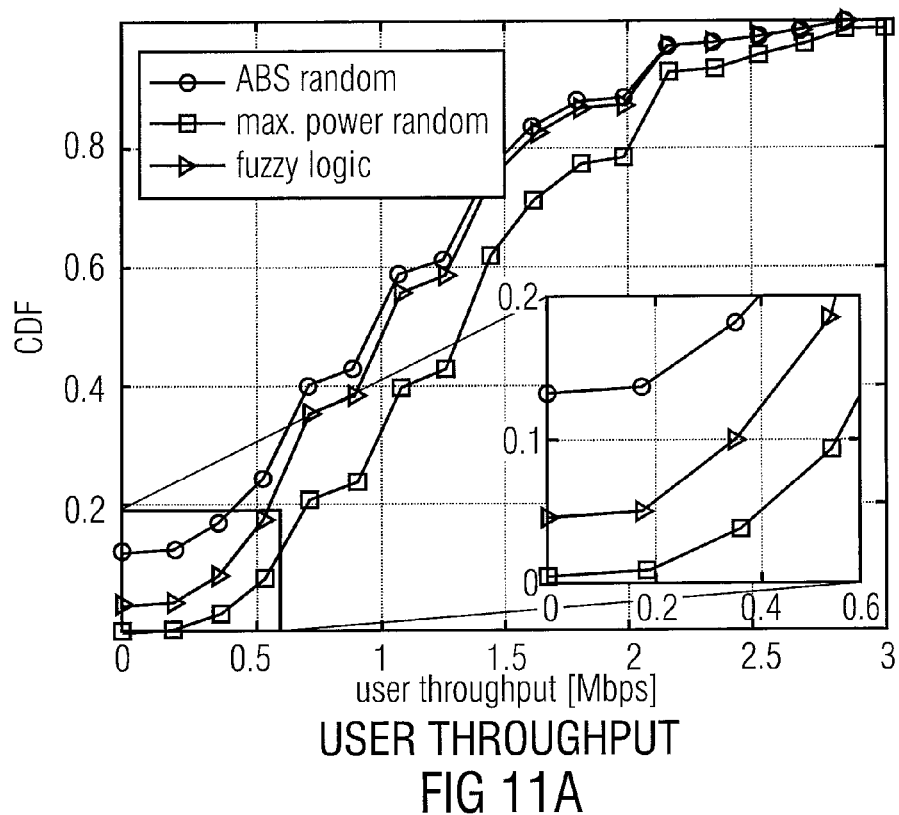
FIGS. 11A and 11B show the system downlink throughput performance results of the fuzzy logic ICIC system in accordance embodiments of the invention in comparison to the random ABS transmission technique, and the maximum power transmission technique.
Figure 11B:
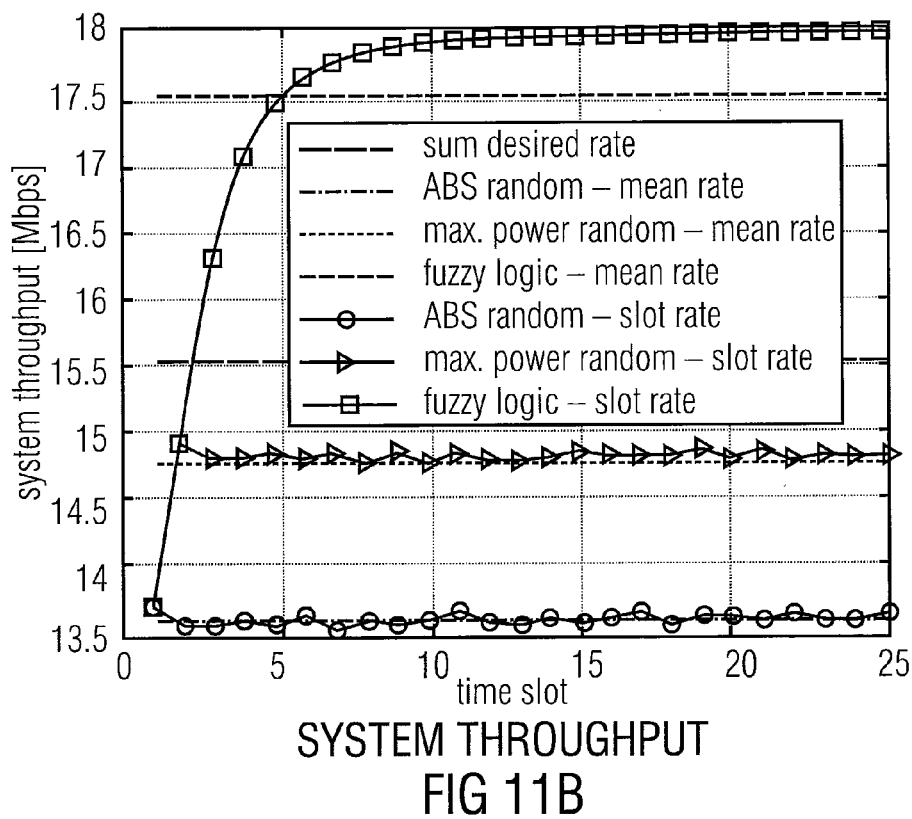

The desired rate of each user is drawn from the Rayleigh distribution so that each user will necessitate a different number of resource blocks, and, hence, the system will function best when strongly interfering femto-cell base stations are assigned orthogonal resources. As can be seen from FIGS. 11A and 11B, the fuzzy logic ICIC approach provides for a substantially improved system performance over both benchmark techniques, the "random almost-subframe (ABS) transmission"-technique and the "maximum power transmission"-technique. FIGS. 11A and 11B show the system downlink throughput performance results of the fuzzy logic ICIC approach in comparison to the random ABS transmission technique, and the maximum power transmission technique. In terms of system throughput (see FIG. 11B) the fuzzy logic approach is the only technique which achieves the overall desired rate, i.e. the sum of individual desired rates. In fact, the fuzzy logic scheme substantially overachieves the sum desired rate, indicating a maximum coverage and all but negligible outage. The ABS performance is constant over all time slots (except for the first time slot), as the probability of a ABS transmission is identical in each slot. Hence, in each time slot 10%, on average, of the users transmit an ABS providing some interference mitigation for the remaining users. This abstinence of data transmission extends the throughput losses by the ABS system relative to full power transmission as clearly the interference mitigation provided is less significant than the throughput sacrificed. Further, with regard to the individual user rates, the fuzzy logic approach also improves the cell-edge throughput by more than 50% compared to the maximum power approach and the downlink, whereas the ABS system is an outage. Furthermore, as can be seen from FIG. 11A, that all mobile station networks attain improved throughput performance when compared to the benchmark techniques, so that not only the system capacity is improved in accordance with the invention, but also substantial benefits for the cell-edge users are seen.

Figure 12A:
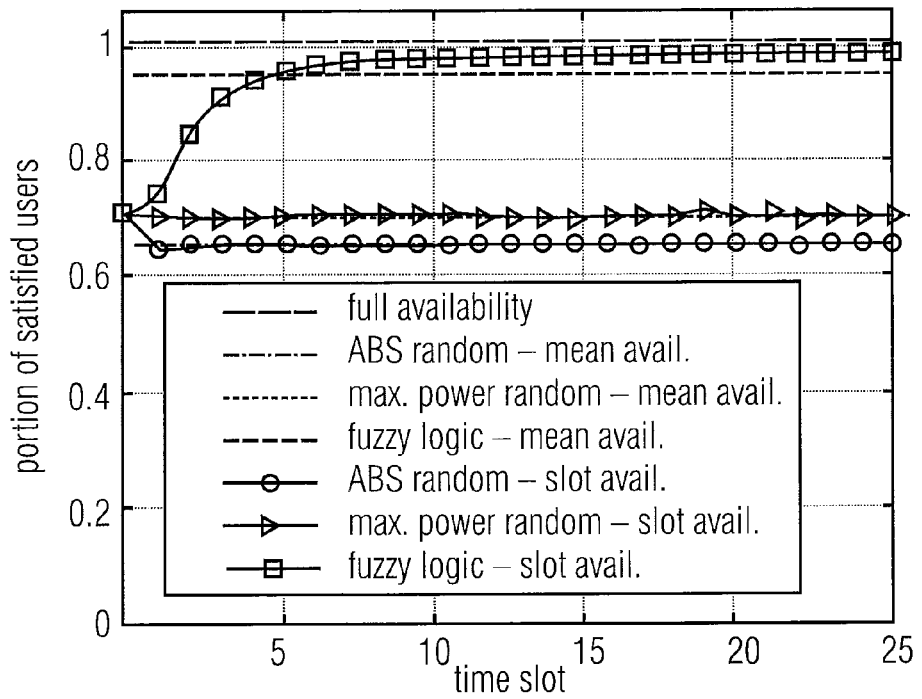
FIGS. 12A and 12B show two graphs representing the system downlink coverage results of the fuzzy logic ICIC approach when compared to the random ABSs transmission technique and the maximum power transmission technique.
Figure 12B:
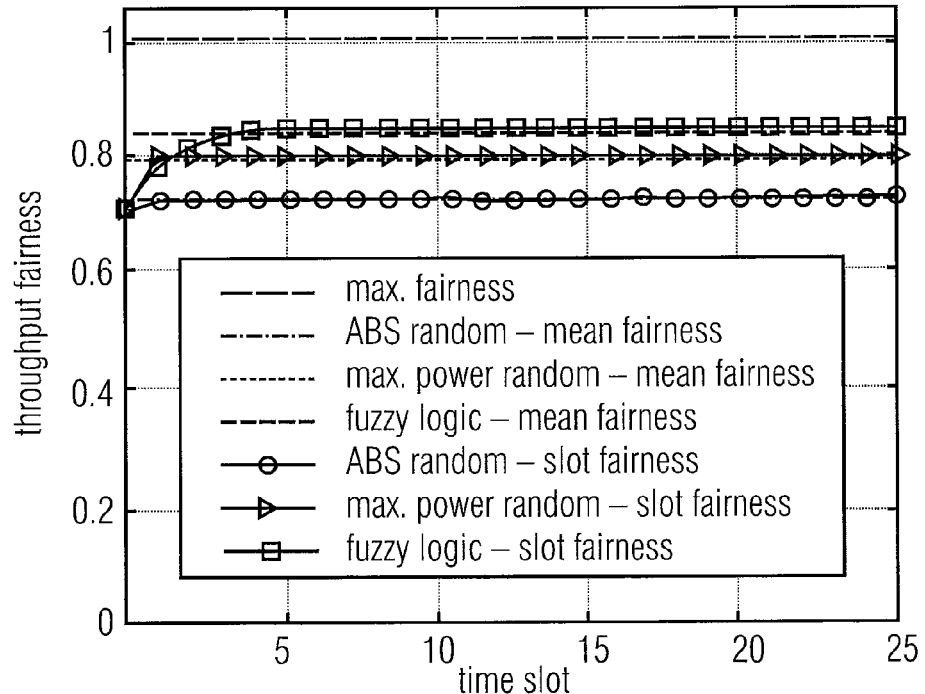

FIGS. 12A and 12B show two graphs representing the system downlink coverage results of the fuzzy logic ICIC approach when compared to the random ABSs transmission technique and the maximum power transmission technique. The fuzzy logic approach provides by far the best mobile station availability, and also the fairest system, as can be seen from FIGS. 12A and 12B, as both the system and cell-edge throughputs are augmented, resulting in a more even rate distribution when compared to the other benchmarks. On another note, the maximum power availability and fairness is boosted with regard to the ABS system, as all mobile stations can transmit without restrictions, and hence even unsatisfied (in terms of rate) users achieve decent throughputs.

Figure 13:
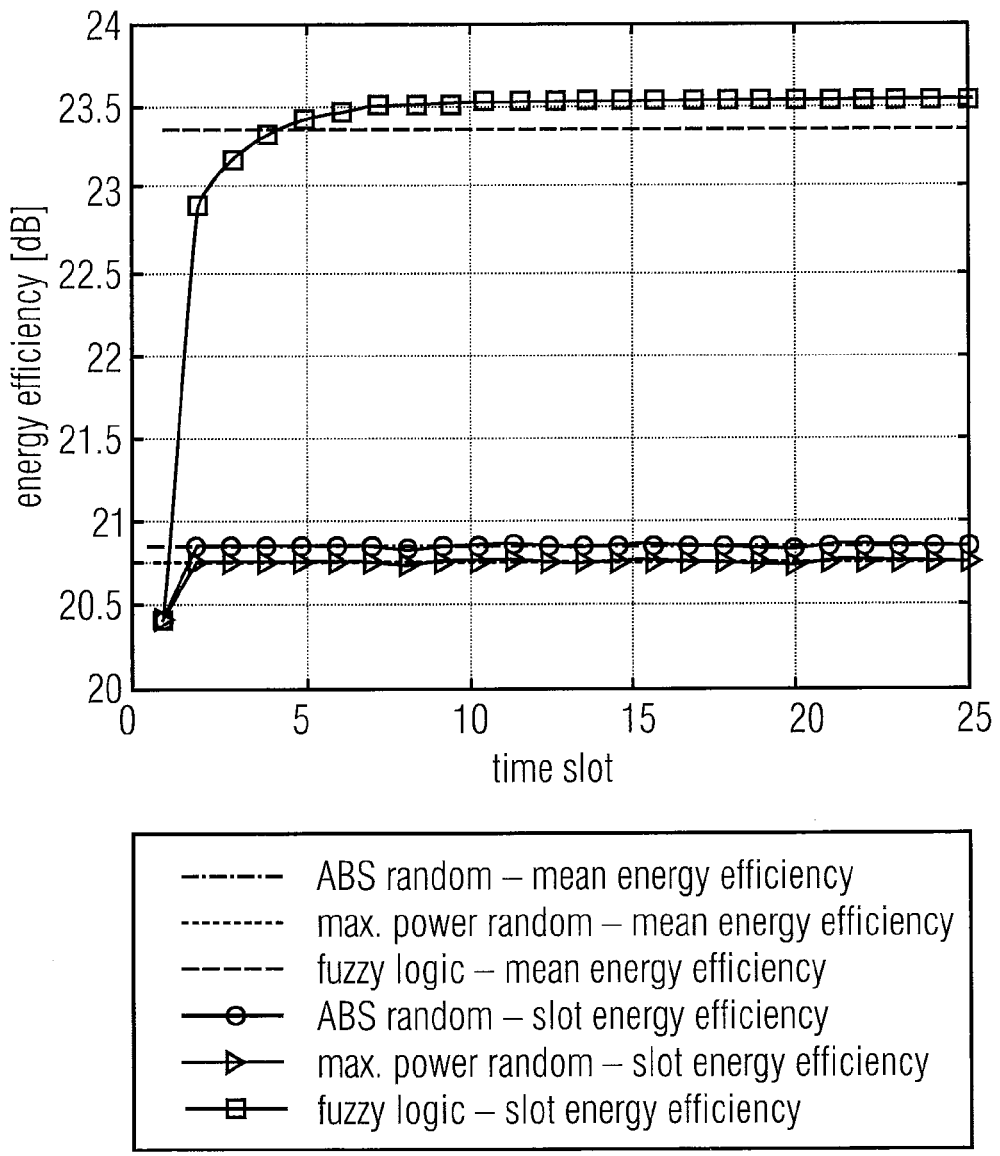
FIG. 13 shows a graph indicating the system downlink energy efficiency results when comparing the fuzzy logic ICIC approach to the random ABSs transmission approach and the maximum power transmission approach.
Figure 14A:
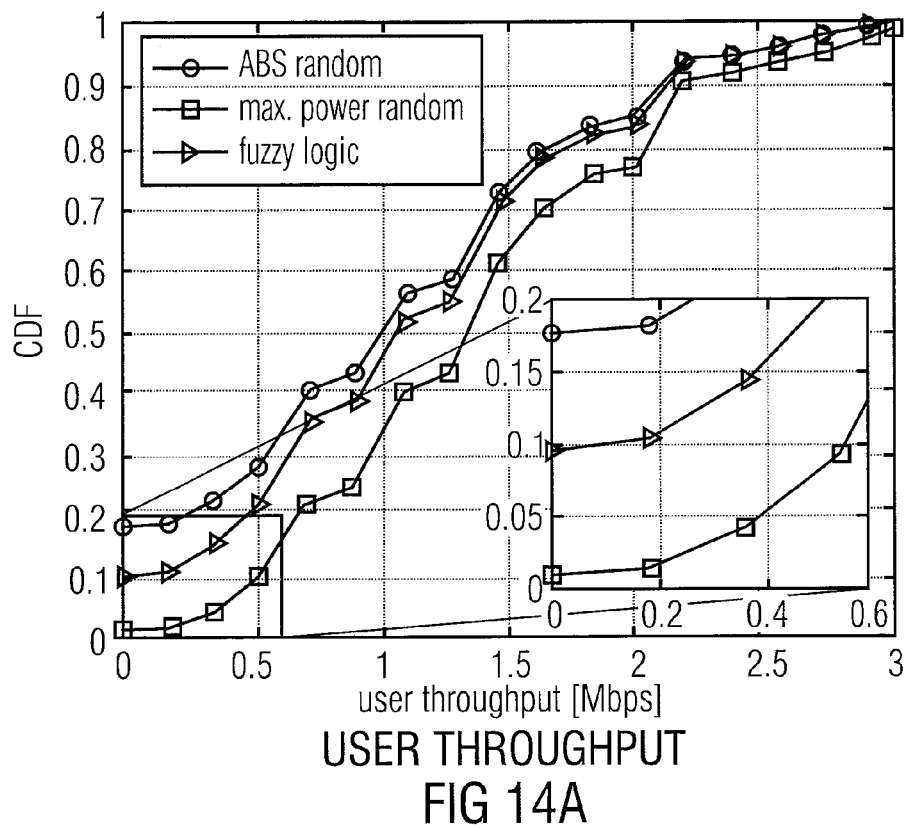
FIGS. 14A-14E show graphs corresponding to the graphs in FIGS. 11A, 11B, 12A, 12B and 13 for a system uplink performance comparison of the fuzzy logic ICIC approach with the benchmark approaches.
Figure 14B:
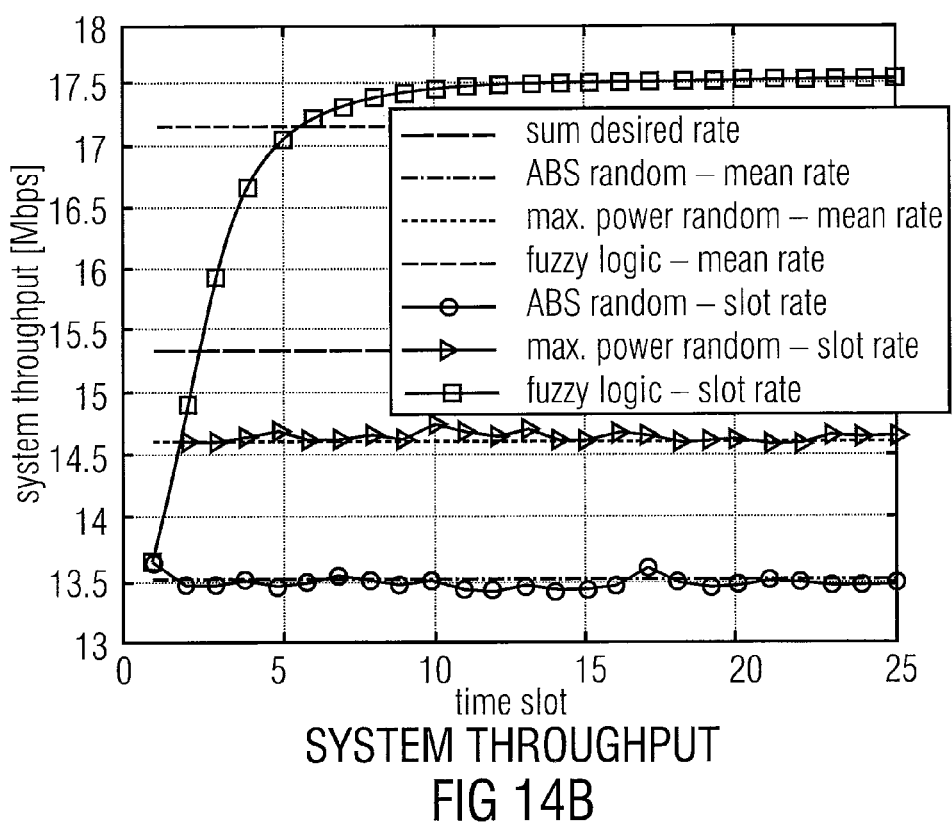
Figure 14C:
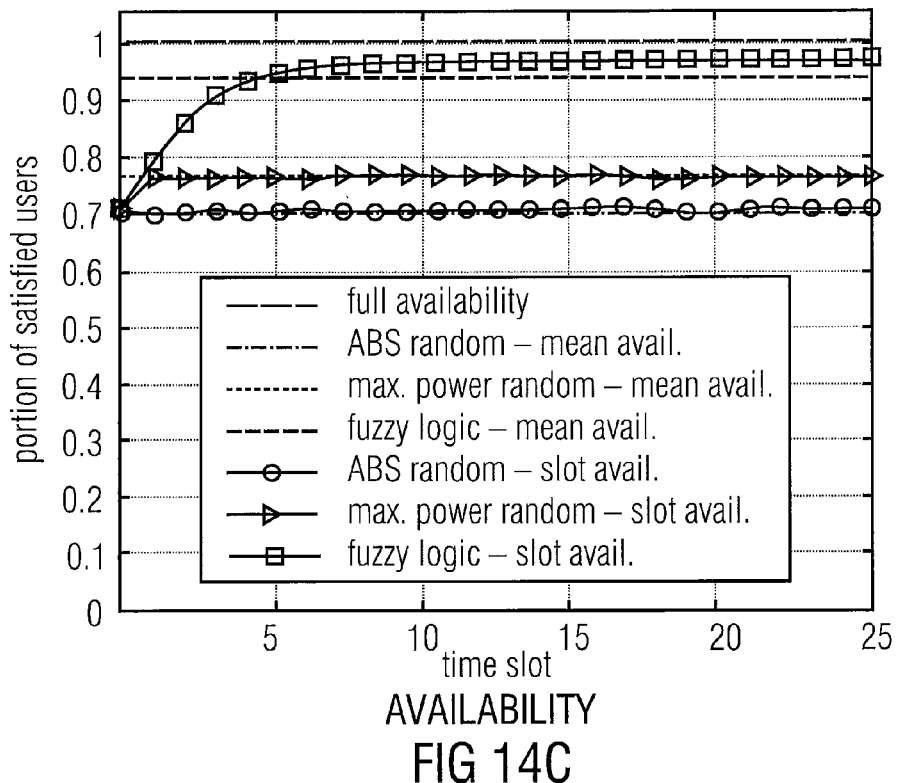
Figure 14D:
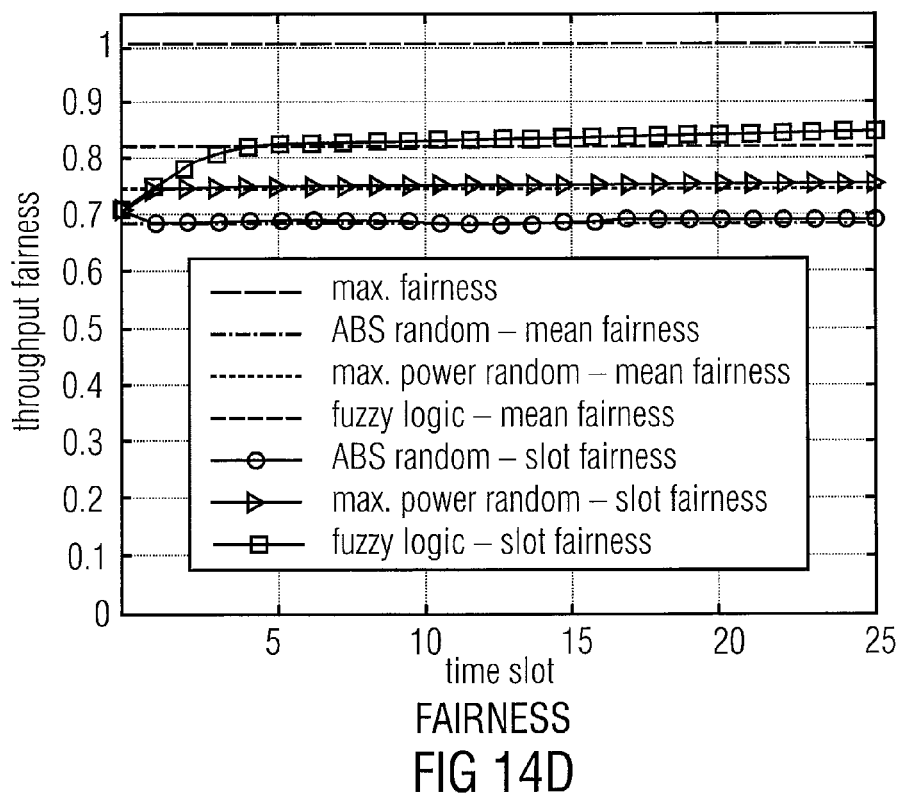
Figure 14E:
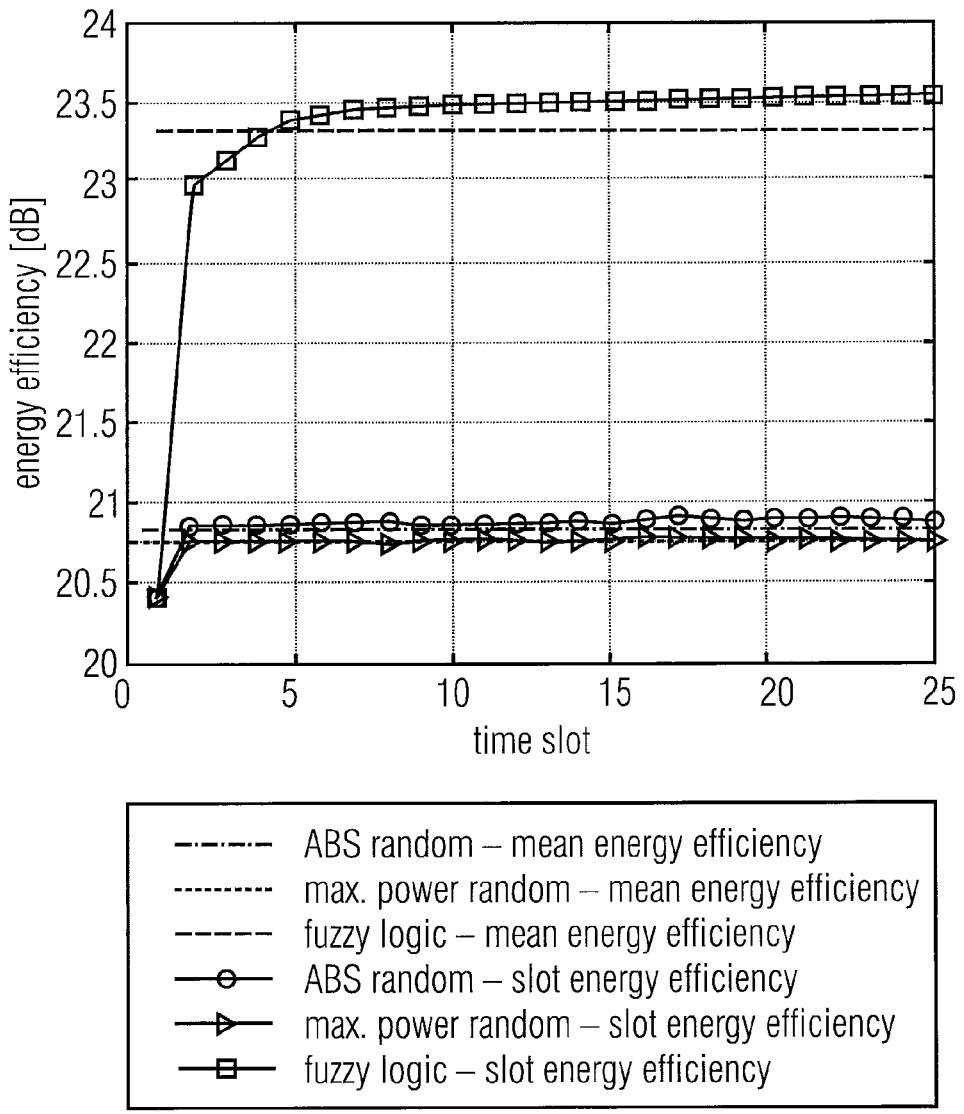
Figure 15A:
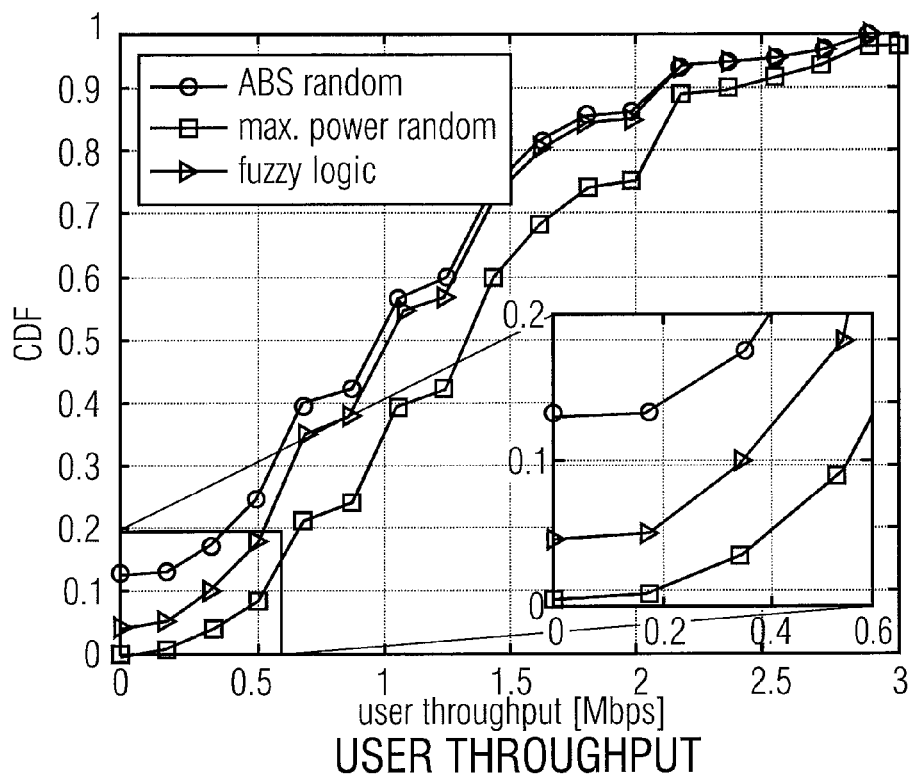
FIGS. 15A-15E show graphs, similar to FIGS. 14A-14E, however, for a fuzzy logic system having been modified to apply transmit power control.
Figure 15B:
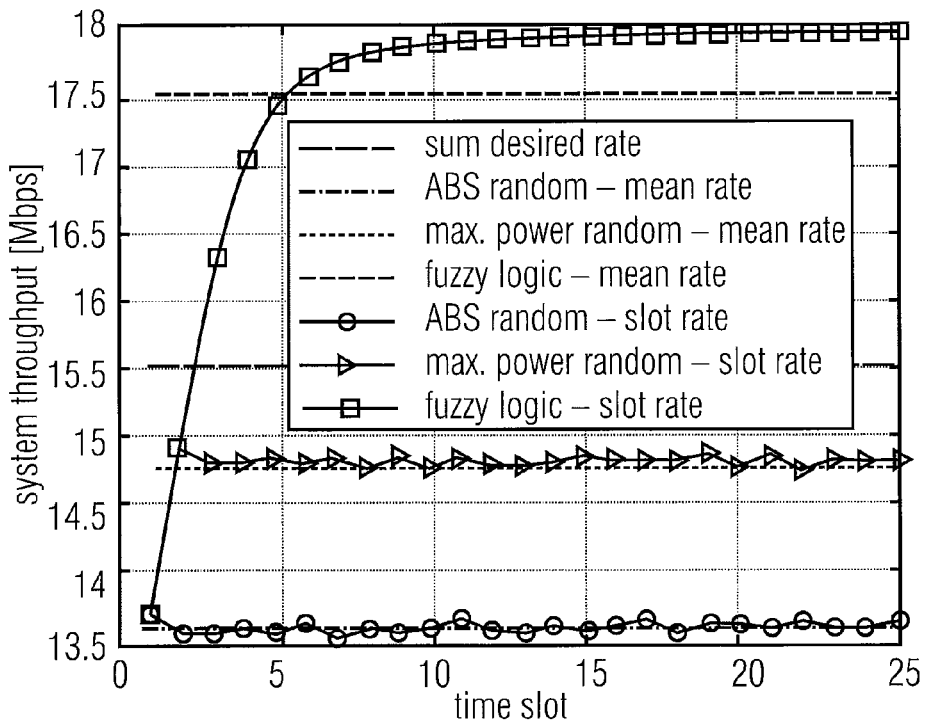
Figure 15C:
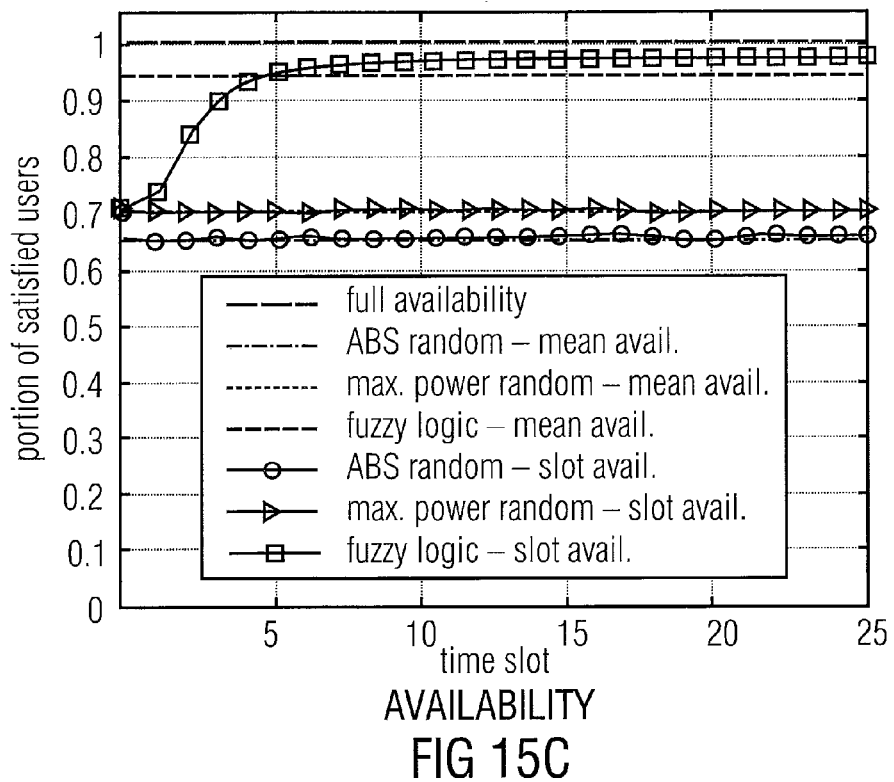
Figure 15D:
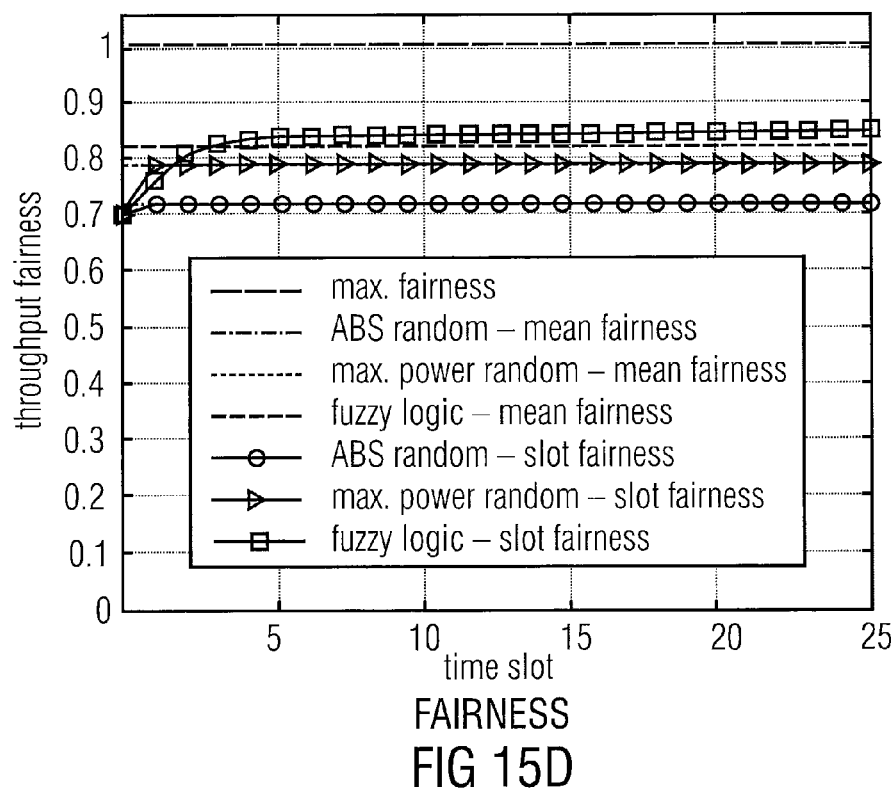
Figure 15E:
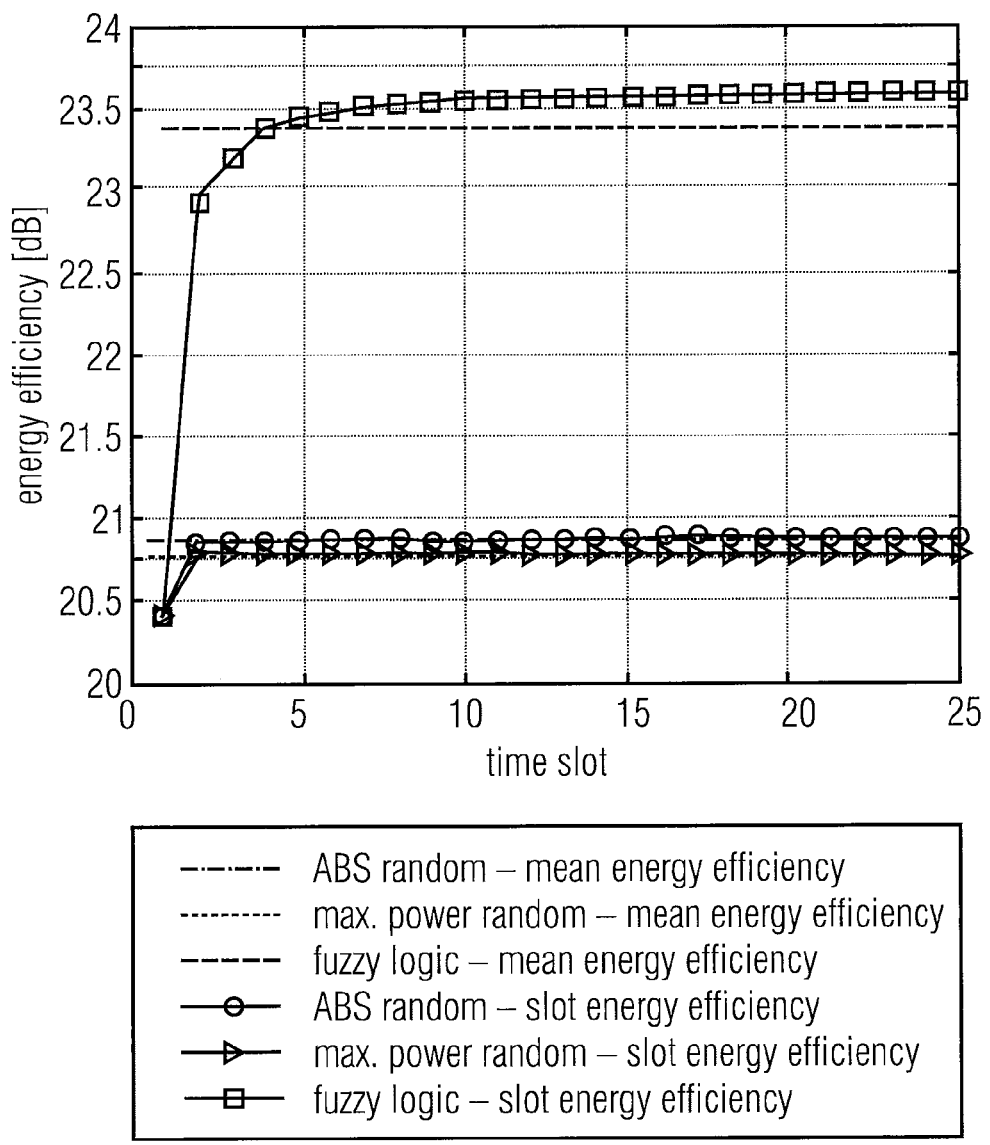

FIG. 13 shows a graph indicating the system downlink energy efficiency results when comparing the fuzzy logic ICIC approach to the random ABSs transmission approach and the maximum power transmission approach. The energy efficiency is defined as $\beta = R/P_t$, where R is the achieved rate and $P_t$ is the used transmit power. The energy efficiency is measured in bits/s/w≡bits/j, however, it is displayed in FIG. 13 in decibel (dB) for ease of visualization. As can be seen from FIG. 13, the energy efficiency of the simulated scenario, again, yields very dominant results of the fuzzy logic system. This is due to the fact that the fuzzy logic system has the possibility of transmitting at half power, which is usually the case after multiple time slots and the achievement of relatively orthogonal resource blocks allocation. Furthermore, the high energy efficiency is achieved quite rapidly. Further, it is shown that the ABSs transmission approach is slightly more energy efficient than the maximum power transmission approach, which is logical, since an average 10% less power is used, but the loss in throughput is less than 10%, thus enhancing the energy efficiency.

To summarize, the fuzzy logic ICIC system in accordance embodiments of the invention provides substantially superior performance in femto-cell networks, in terms of throughput, outage, fairness and energy efficiency.

FIGS. 14A-14E show graphs corresponding to the graphs in FIGS. 11A, 11B, 12A, 12B and 13 for a system uplink performance comparison of the fuzzy logic ICIC approach with the benchmark approaches. As can be seen from FIGS. 14A-14E also in the reverse link, the uplink, the fuzzy logic scheme outperforms the benchmark scheme. FIGS. 15A-15E show graphs, similar to FIGS. 14A-14E, however, the fuzzy logic system has been modified to apply transmit power control. Again, it can be seen that the invention outperforms the benchmark approaches.

Figure 16A:
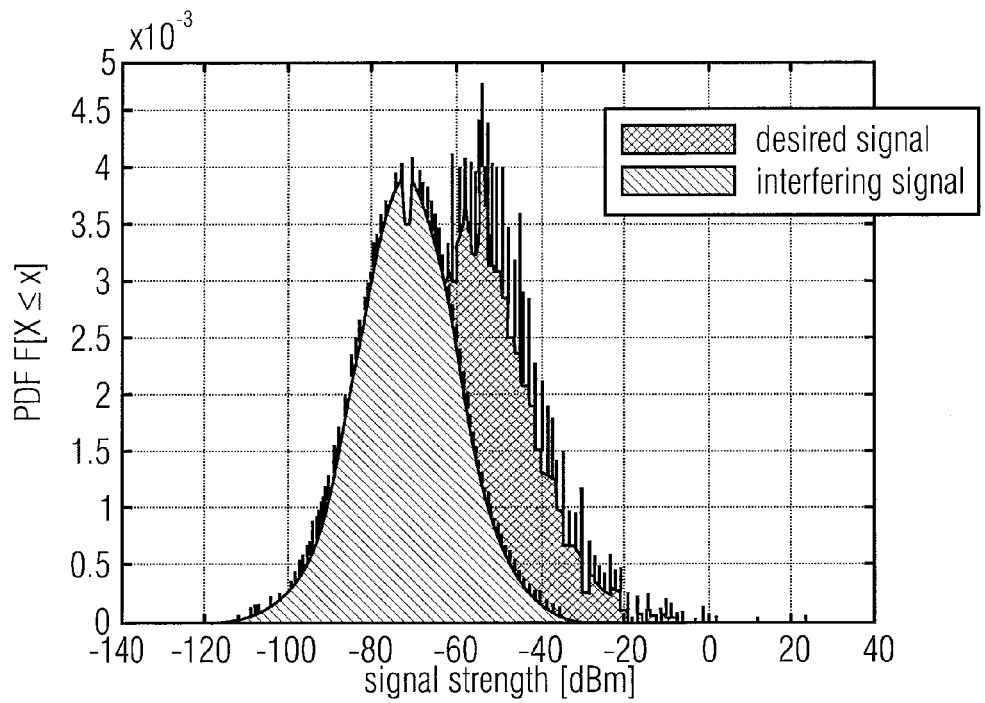
FIGS. 16A and 16B show the PDFs and CDFs of the desired and interfering signal energy received in a densely deployed femto-cell network with maximum power transmission.
Figure 16B:
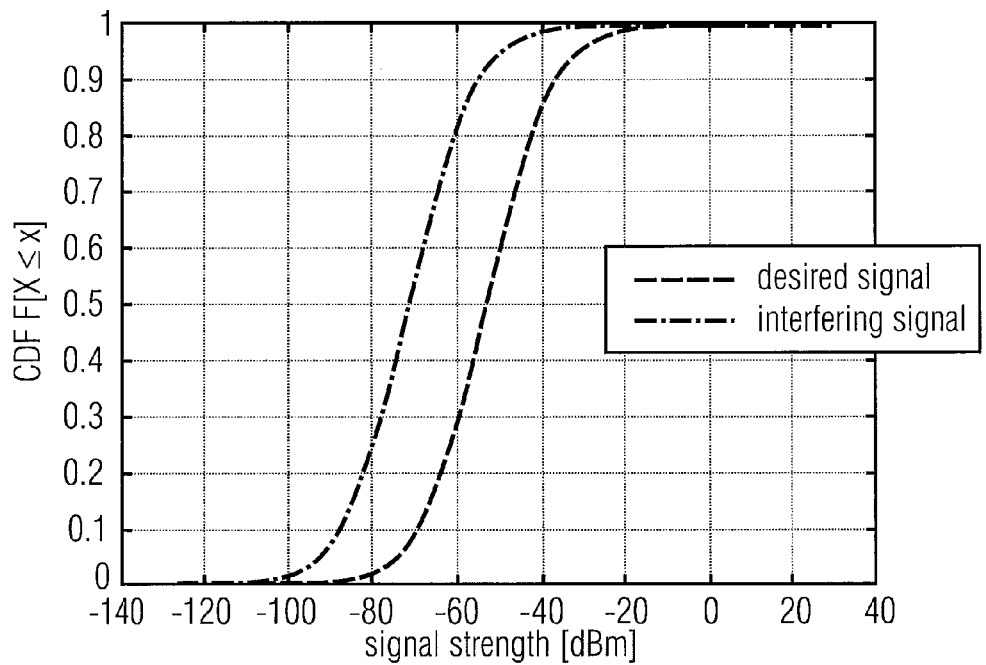

In the above description, reference has been made to the cutoff point of the values for both the desired and the interference signal power input variables which are taken from the CDFs which are shown in FIGS. 16A and 16B. FIGS. 16A and 16B show the PDFs and CDFs of the desired and interfering signal energy received in a densely deployed femto-cell network with maximum power transmission. On the basis of the CDFs shown in FIGS. 16A and 16B for these variables the following points are used:

"low"—from minimum signal level to $\{v|P(X \geq v)=0.4\}$,
"medium"—from $\{x|P(X\_x)=0.3\}$ to $\{y|P(X \geq y)=0.7\}$
"high"—from $\{z|P(X \geq z)=0.6\}$ In case of a power control transmission, the statistics depicted in FIGS. 17A and 17B are used. FIGS. 17A and 17B show the PDFs and the CDFs of the desired and interfering signal energies received in a densely deployed femto-cell network with conventional power control.

While embodiments have been described above with regard to the ICIC approach, it is noted that the invention is a very adaptable technique that can be applied to other control operations within a cell of a network as well, for example, it can also be utilized to determine a modulation and coding rate, for example, MCS, or a MIMO transmission scheme for implementing a desired MIMO special multiplexing or spatial diversity.

While embodiments of the invention have been discussed in detail above with regard to a femto-cell network, like a femto-cell network FC1 to FC4 shown in FIG. 1, it is noted that the invention may also be applied to respective macro-cells 100 (see FIG. 1) and/or respective pico-cell networks, PC1, PC2 as they are for example depicted in FIG. 1.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

References

[1] D. Lopez-Perez, I. Guvenc, G. de la Roche, M. Kountouris, T. Quek, and J. Zhang, "Enhanced intercell interference coordination challenges in heterogeneous networks," Wireless Communications, IEEE, vol. 18, no. 3, pp. 22-30, June 2011.

[2] R. Madan, J. Borran, A. Sampath, N. Bhushan, A. Khandekar, and T. Ji, "Cell association and interference coordination in heterogeneous lte-a cellular networks," Selected Areas in Communications, IEEE Journal on, vol. 28, no. 9, pp. 1479-1489, December 2010.

[3] S.-M. Cheng, S.-Y. Lien, F.-S. Chu, and K.-C. Chen, "On exploiting cognitive radio to mitigate interference in macro/femto heterogeneous networks," Wireless Communications, IEEE, vol. 18, no. 3, pp. 40-47, June 2011.

[4] X. Li, L. Qian, and D. Kataria, "Downlink power control in co-channel macrocell femtocell overlay," in Proc. of. Conference on Information Sciences and Systems (CISS), 2009, pp. 383-388.

[5] B.-G. Choi, E. S. Cho, M. Y. Chung, K.-y. Cheon, and A.-S. Park, "A femtocell power control scheme to mitigate interference using listening tdd frame," in Proc. of International Conference on Information Networking (ICOIN), January 2011, pp. 241-244.

[6] E. J. Hong, S. Y. Yun, and D.-H. Cho, "Decentralized power control scheme in femtocell networks: A game theoretic approach," in Proc. of Personal, Indoor and Mobile Radio Communications (PIMRC), 2009, pp. 415-419.

[7] A. Rao, "Reverse Link Power Control for Managing Inter-Cell Interference in Orthogonal Multiple Access Systems," in Proc. of. Vehicular Technology Conference (VTC), October 2007, pp. 1837-1841.

[8] Y.-Y. Li, M. Macuha, E. Sousa, T. Sato, and M. Nanri, "Cognitive interference management in 3g femtocells," in Personal, Indoor and Mobile Radio Communications, 2009 IEEE 20th International Symposium on, September 2009, pp. 1118-1122.

[9] J. Ling, D. Chizhik, and R. Valenzuela, "On resource allocation in dense femto-deployments," in Microwaves, Communications, Antennas and Electronics Systems, 2009. COMCAS 2009. IEEE International Conference on, November 2009, pp. 1-6.

[10] J. Ellenbeck, C. Hartmann, and L. Berlemann, "Decentralized inter-cell interference coordination by autonomous spectral reuse decisions," in Wireless Conference, 2008. EW 2008. 14th European, June 2008, pp. 1-7.

[11] C. Lee, J.-H. Huang, and L.-C. Wang, "Distributed channel selection principles for femtocells with two-tier interference," in Vehicular Technology Conference (VTC 2010-Spring), 2010 IEEE 71st, May 2010, PP. 1-5.

[12] X. Chu, Y. Wu, L. Benmesbah, and W.-K. Ling, "Resource allocation in hybrid macro/femto networks," in Wireless Communications and Networking Conference Workshops (WCNCW), 2010 IEEE, April 2010, pp. 1-5.

[13] M. Iwamura, K. Etemad, M.-H. Fong, R. Nory, and R. Love, "Carrier aggregation framework in 3gpp lte-advanced [wimax/lte update]," Communications Magazine, IEEE, vol. 48, no. 8, pp. 60-67, august 2010.

[14] S. Abeta, "Toward lte commercial launch and future plan for lte enhancements (lte-advanced)," in Communication Systems (ICCS), 2010 IEEE International Conference on, November 2010, pp. 146-150.

[15] L. Garcia, K. Pedersen, and P. Mogensen, "Autonomous component carrier selection for local area uncoordinated deployment of lte-advanced," in Vehicular Technology Conference Fall (VTC 2009-Fall), 2009 IEEE 70th, September 2009, pp. 1-5.

[16] _____, "Autonomous component carrier selection: interference management in local area environments for lte-advanced," Communications Magazine, IEEE, vol. 47, no. 9, pp. 110-116, September 2009.

[17] L. Zhang, L. Yang, and T. Yang, "Cognitive interference management for lte-a femtocells with distributed carrier selection," in Vehicular Technology Conference Fall (VTC 2010-Fall), 2010 IEEE 72nd, September 2010, pp. 1-5.

What is claimed is:

1. A method for controlling operation within a cell of a wireless cellular network, the wireless cellular network comprising a plurality of cells, each cell comprising a base station for serving one or more mobile users, the method comprising:

controlling, by a base station of the cell, an operation within the cell using a fuzzy logic, wherein input variables for the fuzzy logic comprise input variables determined on the basis of information only locally available in the cell, wherein the operation to be controlled within the cell comprises resource and power allocation, wherein resource and power allocation to a user served by the base station of a cell is performed on the basis of interference information about an interference incident from one or more neighboring cells, the input variables for the fuzzy logic being determined on the basis of interference information only locally available in the cell, and the base station allocates resource blocks such that a desired signal to the user is acquired, the interference incident from one or more neighboring cells is reduced or minimized, and a rate requirement of the user in the cell is fulfilled, wherein the locally available information comprise a necessitated rate of the user; a quality or strength of the desired signal; a level of interference incident on the resource blocks; and a frequency-selective fading profile.

2. The method of claim 1, wherein the control is performed at the base station independent from one or more neighboring base stations in the wireless cellular network.

3. The method of claim 1, wherein the control is performed at the base station individually without a communication regarding the control with one or more neighboring base stations in the wireless cellular network.

4. The method of claim 1, wherein the base station performs the resource and power allocation to the user independent from one or more neighboring and/or interfering base stations in the wireless cellular network.

5. The method of claim 1, wherein the base station performs the resource and power allocation to the user individually without a communication regarding the resource and power allocation with one or more neighboring and/or interfering base stations in the wireless cellular network.

6. The method of claim 1, wherein
the necessitated rate of the user determines the number of resource blocks that need to be assigned;
the strength of the desired signal determines the necessitated transmit power;
the level of interference incident on the resource blocks determines the allocatability of each resource block; and
the selection of resource blocks to be allocated depends on the frequency-selective fading profile.

7. The method of claim 1, wherein the necessitated rate, the quality or strength of the desired signal, the level of interference incident on the resource blocks, and the frequency-selective fading profile are locally available at the base station in the reverse link, and at the user in the forward link.

8. The method of claim 1, wherein the base station
evaluates which resource blocks are most suitable to be allocated to the user in a particular time slot, and
determines the transmit power on the allocated resource blocks to generate a necessitated signal-to-interference-plus-noise ratio in accordance with the necessitated rate.

9. The method of claim 8, wherein the base station uses the fuzzy logic to determine the allocatability of each resource block in each time slot on the basis of the locally available information.

10. The method of claim 1, wherein the input variables of the fuzzy logic comprise:
the necessitated rate of the user which is defined by the service demanded by the user, the values for the necessitated rate being "Low", "Low-medium", "Medium-high" and "High";
the strength of the desired signal, the values for the strength of the desired signal being "Low", "Medium" and "High";
the level of interference which indicates the interference environment for each user on each resource block, the values for the level of interference being "Low", "Medium" and "High"; and
the frequency-selective fading profile, the values for the frequency-selective fading profile being "Deep", "Average" and "Peak".

11. The method of claim 10, wherein the output variables of the fuzzy logic comprise:
a resource block allocation for the user, wherein the allocatability of each resource block is calculated by the fuzzy logic depending on the values of the input variables; and
the transmit powers of the resource blocks assigned to the user, wherein each resource block transmits with either half or full power, depending on the values of the input variables.

12. The method of claim 1, comprising:
in each time slot, allocating the most applicable resource blocks and transmit power according to the fuzzy logic rules to the user and performing data transmission.

13. The method of claim 1, comprising:
based on received signal levels from the user and from interfering mobile stations, updating the locally available interference information regarding the level of interference incident on the resource blocks and the frequency-selective fading profile to more accurately represent the long-term interference and fading environments of the cell; and
using the updated information in a following time slot for the resource and power allocation.

14. The method of claim 1, comprising performing the control in a plurality of cells of the wireless cellular network, thereby continuously individually optimizing the control so that for the plurality of cells of the wireless cellular network a stable global solution is reached in accordance with which the one or more users in each cell are satisfied.

15. The method of claim 1, wherein the wireless cellular network comprises a macro cell network, a pico cell network or a femto cell network.

16. A non-transitory computer program product comprising instructions stored on a machine-readable medium for performing the method of claim 1, when the instructions are executed on a computer.

17. A base station of a cell of a wireless cellular network, the wireless cellular network comprising a plurality of cells, each cell comprising a base station for serving one or more mobile stations, comprising:
a fuzzy logic for controlling an operation within the cell using the fuzzy logic,
wherein input variables for the fuzzy logic comprise input variables determined on the basis of information only locally available in the cell,
wherein the operation to be controlled within the cell comprises resource and power allocation,
wherein
resource and power allocation to a user served by the base station of a cell is performed on the basis of interference information about an interference incident from one or more neighboring cells, the input variables for the fuzzy logic being determined on the basis of interference information only locally available in the cell, and
the base station allocates resource blocks such that a desired signal to the user is acquired, the interference incident from one or more neighboring cells is reduced or minimized, and a rate requirement of the user in the cell is fulfilled, wherein the locally available information comprise a necessitated rate of the user; a quality or strength of the desired signal; a level of interference incident on the resource blocks; and a frequency-selective fading profile.

18. A wireless cellular network, comprising a plurality of cells, wherein one or more of the cells comprise a base station of claim 17.

* * * * *